(12) United States Patent
Matsuo et al.

(10) Patent No.: US 11,956,067 B2
(45) Date of Patent: Apr. 9, 2024

(54) WIRELESS BASE STATION, CONTROL SYSTEM, ELECTRONIC DEVICE, AND WIRELESS COMMUNICATION TERMINAL

(71) Applicant: KABUSHIKI KAISHA TOSHIBA, Tokyo (JP)

(72) Inventors: Ryoko Matsuo, Shinagawa Tokyo (JP); Miyuki Ogura, Tachikawa Tokyo (JP); Koji Akita, Yokohama Kanagawa (JP); Tomoya Tandai, Ota Tokyo (JP); Toshihisa Nabetani, Kawasaki Kanagawa (JP); Tsuyoshi Kogawa, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 281 days.

(21) Appl. No.: 17/470,106

(22) Filed: Sep. 9, 2021

(65) Prior Publication Data
US 2022/0116108 A1    Apr. 14, 2022

(30) Foreign Application Priority Data
Oct. 14, 2020  (JP) .................................. 2020-173299

(51) Int. Cl.
*H03C 3/00* (2006.01)
*H03C 7/00* (2006.01)
(Continued)

(52) U.S. Cl.
CPC .......... *H04B 7/2606* (2013.01); *H04B 7/022* (2013.01); *H04L 5/0048* (2013.01); *H01Q 1/246* (2013.01)

(58) Field of Classification Search
CPC ..... H04B 7/2606; H04B 7/022; H04L 5/0048; H04L 1/1858; H04L 5/0044;
(Continued)

(56) References Cited

U.S. PATENT DOCUMENTS

2020/0092685 A1*  3/2020  Fehrenbach .......... H04W 72/23
2021/0160846 A1    5/2021  Wu

FOREIGN PATENT DOCUMENTS

JP    2019148870 A    9/2019
WO    2020031397 A1   2/2020

OTHER PUBLICATIONS

Kitagawa, et al., "A Performance Evaluation of D2D Relay Communication in 5G Systems", IEICE Technical Report (vol. 117, No. 457, SR2017-114), 2018, pp. 17-23.

* cited by examiner

*Primary Examiner* — Tanmay K Shah
(74) *Attorney, Agent, or Firm* — Holtz, Holtz & Volek PC

(57) ABSTRACT

According to one embodiment, a wireless base station includes a transmitter and a receiver. The transmitter transmits a control signal and one or more operation signals to the second wireless communication terminal. The control signal instructs to transmit a signal that requests terminal-to-terminal communication between a first wireless communication terminal and the second wireless communication terminal. The operation signals are used for operating at least a part of the first wireless communication terminal. The receiver is capable of receiving at least one of a response signal or a data signal transmitted from the first wireless communication terminal to the second wireless communication terminal after the operation signals are transmitted.

17 Claims, 11 Drawing Sheets

(51) Int. Cl.
*H04B 7/022* (2017.01)
*H04B 7/26* (2006.01)
*H04L 5/00* (2006.01)
*H04L 27/00* (2006.01)
*H01Q 1/24* (2006.01)

(58) Field of Classification Search
CPC .......... H04L 5/0091; H04L 2001/0097; H01Q 1/246; H04W 72/20; H04W 36/03; H04W 88/04; H04W 92/18
USPC .......................................................... 375/315
See application file for complete search history.

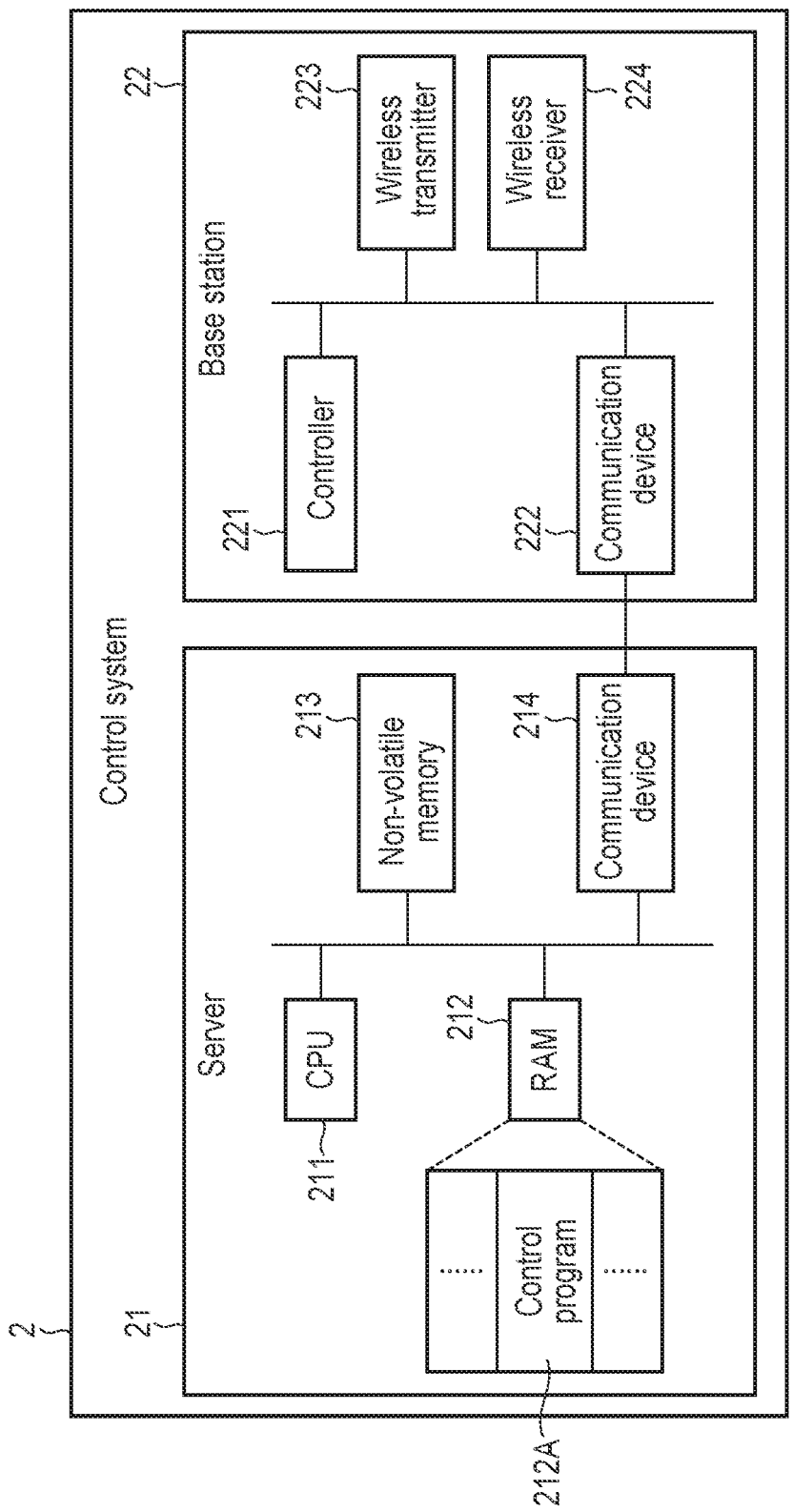
F I G. 3

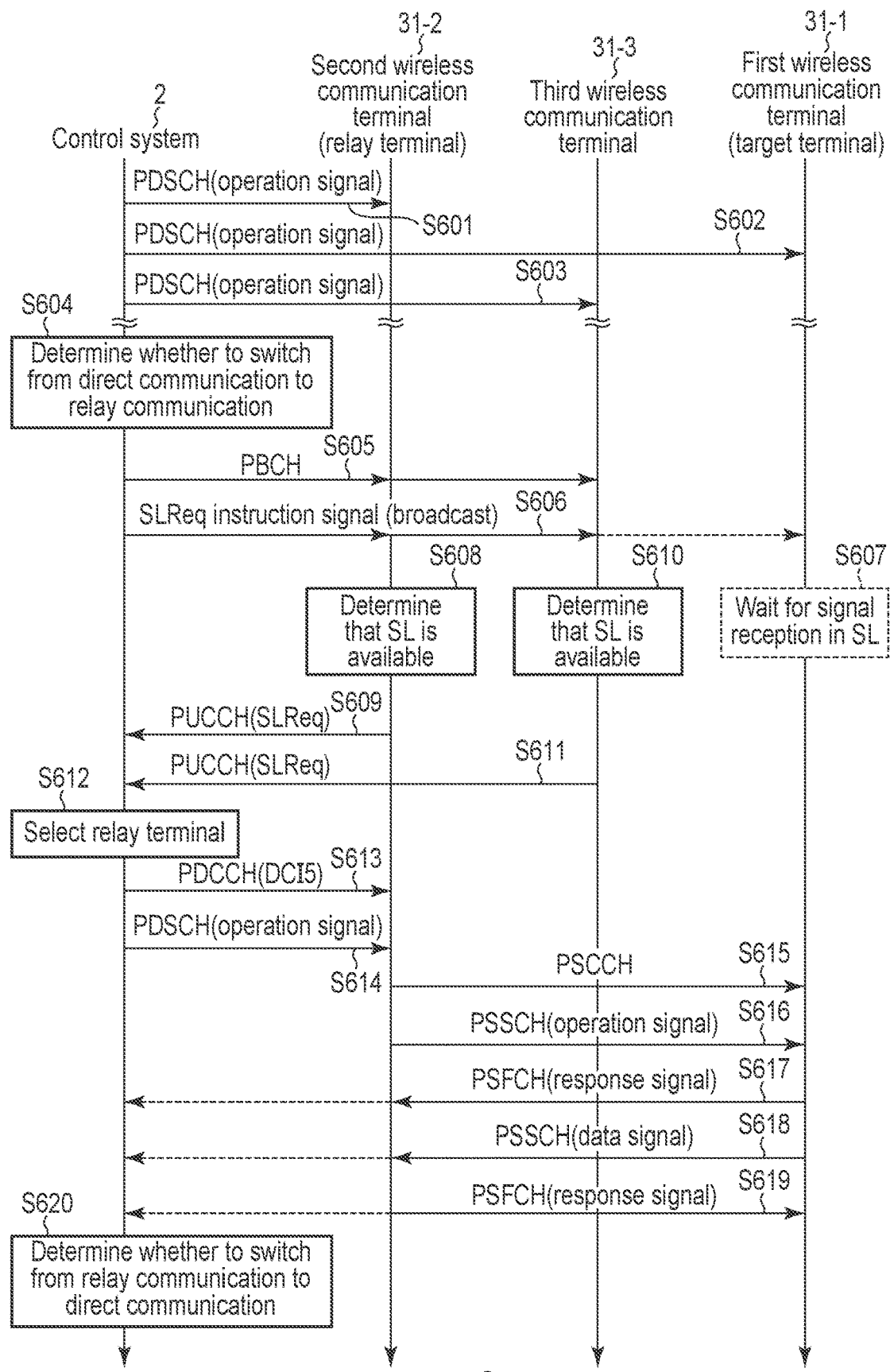
F I G. 11

WIRELESS BASE STATION, CONTROL SYSTEM, ELECTRONIC DEVICE, AND WIRELESS COMMUNICATION TERMINAL

CROSS-REFERENCE TO RELATED APPLICATIONS

This application is based upon and claims the benefit of priority from Japanese Patent Application No. 2020-173299, filed Oct. 14, 2020, the entire contents of which are incorporated herein by reference.

FIELD

Embodiments described herein relate generally to a wireless base station, a control system, an electronic device, and a wireless communication terminal.

BACKGROUND

A system of comprehensively controlling operations of automated mobile robots (AMRs) at a server using high speed and low latency wireless communication standard such as fifth generation mobile communication system (5G) has been considered. In this system, wireless communication between a base station and each AMR must be maintain in a good state.

If the system is applied to, for example, a factory or a warehouse, it is presumed that the wireless communication state will be changed by various factors such as a change of the arrangement of items and movements of people. Thus, there may be cases where maintaining the wireless communication between the base station and each AMR in a good state is difficult.

Note that, in the 3rd Generation Partnership Project (3GPP), standardization related to 5G is considered. One of functions that are considered is a mechanism which is referred to as sidelink or Device-to-Device (D2D). The sidelink is a mechanism to transmit/receive signals between two wireless communication terminals (for example, two AMRs) without a base station interposed therebetween.

BRIEF DESCRIPTION OF THE DRAWINGS

FIG. 3 is a block diagram illustrating a configuration example of the control system of the first embodiment.

FIG. 11 is a diagram illustrating another example of the processing sequence in the wireless communication system of FIG. 10.

DETAILED DESCRIPTION

Figure 1:
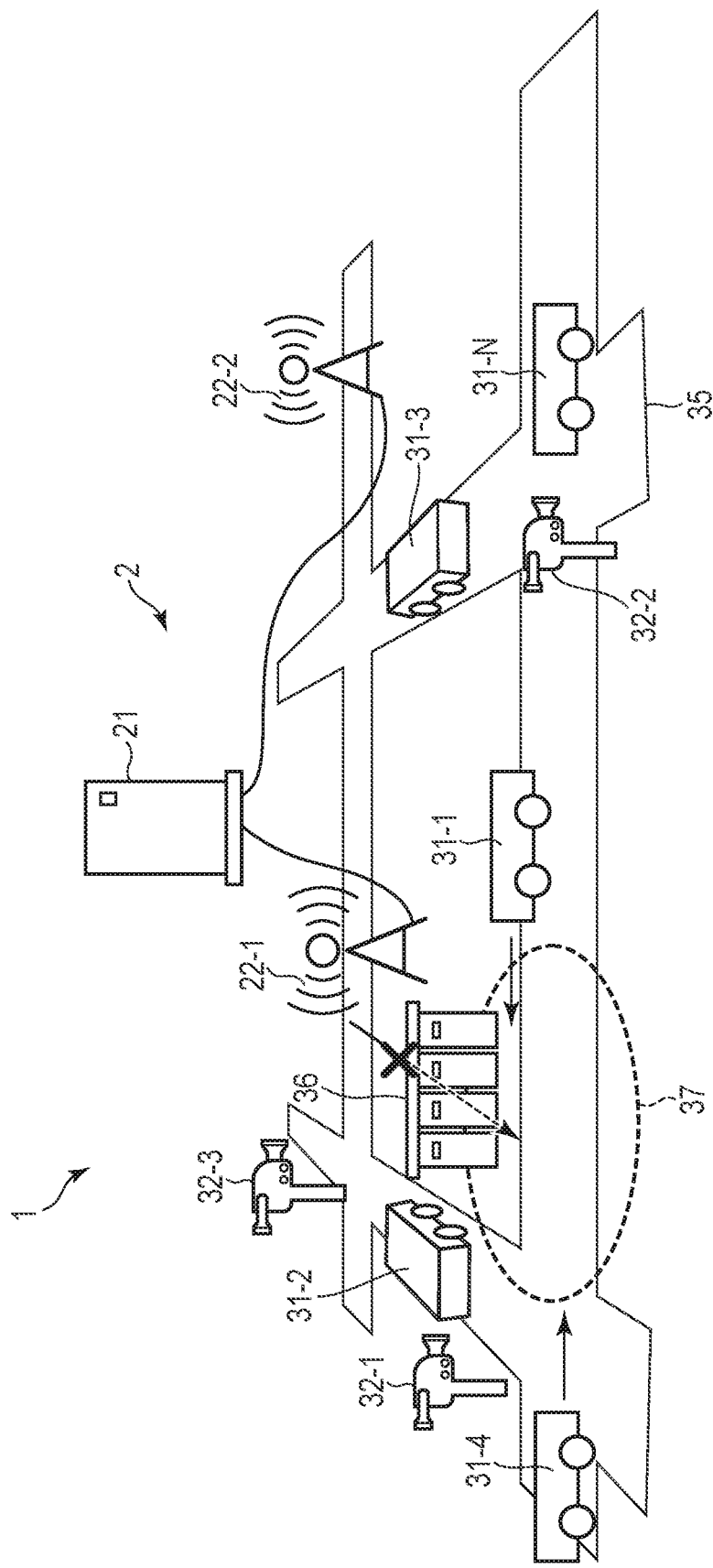
FIG. 1 is a diagram illustrating a configuration example of a wireless communication system including a control system according to a first embodiment.

Various embodiments will be described hereinafter with reference to the accompanying drawings.

In general, according to one embodiment, a wireless base station includes a transmitter and a receiver. The transmitter transmits a first control signal to a second wireless communication terminal and transmit one or more first operation signals to the second wireless communication terminal. The first control signal instructs to transmit a signal that requests terminal-to-terminal communication between a first wireless communication terminal and the second wireless communication terminal. The one or more first operation signals are used for operating at least a part of the first wireless communication terminal. The receiver is capable of receiving at least one of a response signal or a data signal that is transmitted from the first wireless communication terminal to the second wireless communication terminal after the first operation signals are transmitted. The transmitter transmits, if the at least one of the response signal or the data signal is received, a second operation signal to either the first wireless communication terminal or the second wireless communication terminal in accordance with the at least one of the response signal or the data signal. The second operation signal is used for operating at least a part of the first wireless communication terminal. The transmitter transmits, if none of the response signal and the data signal is received, the second operation signal to the second wireless communication terminal. The terminal-to-terminal communication between the first wireless communication terminal and the second wireless communication terminal to be started by the first control signal is defined as including: transmitting the one or more first operation signals, which are transmitted to the second wireless communication terminal, to the first wireless communication terminal from the second wireless communication terminal; and transmitting the second operation signal, which is transmitted to the second wireless communication terminal, to the first wireless communication terminal from the second wireless communication terminal.

First Embodiment

A configuration example of a wireless communication system including a control system according to a first embodiment will be explained with reference to FIG. 1. A wireless communication system 1 is a system for wirelessly operating (controlling) at least a part of a wireless communication terminal existing in a specific space. The specific space is a space of Internet of Things (IoT) in which many wireless communication terminals are connected via a network, and is, for example, a factory or a warehouse. The wireless communication system 1 forms, for example, a fifth generation mobile communication system (5G) defined by 3rd Generation Partnership Project (3GPP).

The wireless communication system 1 includes a control system 2 and N wireless communication terminals 31-1, 31-2, 31-3, 31-4, . . . , and 31-N. N is an integer of two or more. The number of wireless communication terminals 31-1, 31-2, 31-3, 31-4, . . . , and 31-N in the wireless communication system 1 is set freely. The control system 2 and each of the wireless communication terminals 31-1, 31-2, 31-3, 31-4, . . . , and 31-N may perform wireless communication therebetween.

The control system 2 operates at least a part of the respective wireless communication terminals 31-1, 31-2, 31-3, 31-4, . . . , and 31-N through wireless communication. The control system 2 includes a server 21 and one or more base stations 22-1 and 22-2. The server 21 and each of the one or more base stations 22-1 and 22-2 are connected through a wired (or wireless) manner. Note that, there may be any number of servers 21 and any number of base stations 22-1 and 22-2 in the wireless communication system 1. In the figure, it is assumed that the server and the base stations are physically separated and installed in different locations, but the system envisioned in the present application is not limited thereto, and one of the base stations and the server may be integrated.

The server 21 may be realized as a server computer (i.e., an electronic device). The server 21 may be a mobile edge computing (MEC) server. The server 21 generates signals to operate at least a part of the respective wireless communication terminals 31-1, 31-2, 31-3, 31-4, . . . , and 31-N. The server 21 controls routes for transferring the generated signals to the respective wireless communication terminals 31-1, 31-2, 31-3, 31-4, . . . , and 31-N.

Each base station 22-1, 22-2 is a wireless base station that may perform wireless communication with each of the wireless communication terminals 31-1, 31-2, 31-3, 31-4, . . . , and 31-N.

Specifically, each base station 22-1, 22-2 may transmit a signal to one of the wireless communication terminals 31-1, 31-2, 31-3, 31-4, . . . , and 31-N in accordance with a request by the server 21. Each base station 22-1, 22-2 may transmit a signal to two or more of the wireless communication terminals 31-1, 31-2, 31-3, 31-4, . . . , and 31-N by use of multicast in accordance with a request by the server 21. Each base station 22-1, 22-2 may transmit a signal to all the wireless communication terminals 31-1, 31-2, 31-3, 31-4, . . . , and 31-N by use of broadcast in accordance with a request by the server 21.

Furthermore, each base station 22-1, 22-2 may receive a signal from each of the wireless communication terminals 31-1, 31-2, 31-3, 31-4, . . . , and 31-N. Each base station 22-1, 22-2 transmits the received signal to the server 21, for example.

In the following description, any one of the wireless communication terminals 31-1, 31-2, 31-3, 31-4, . . . , and 31-N may be referred to as a wireless communication terminal 31. Any one of the base stations 22-1 and 22-2 may be referred to as a base station 22.

The wireless communication terminal 31 is, for example, an automated mobile robot (AMR). In this case, movement of the wireless communication terminal 31 is operated (controlled) by the control system 2.

The wireless communication terminal 31 may be an industrial robot having a drive mechanism capable of at least one of movement and rotation of a part thereof. This drive mechanism is, for example, a robot arm of the industrial robot. In this case, at least one of movement and rotation of the robot arm is operated by the control system 2.

The wireless communication terminal 31 is not limited to an AMR or an industrial robot, but may be any device which can be at least partially operated remotely. The wireless communication terminal 31 may be a robot used in various purposes, a transportation device, a machine tool, a surveillance camera, a vehicle with an automatic driving function, an Automated Guided Vehicle (AGV), an unmanned aerial vehicle, a drone, or a display device for Virtual Reality (VR) or Augmented Reality (AR).

Specifically, in a case where the wireless communication terminal 31 is a vehicle with an automatic driving function or an AGV, the control system 2 may control the movement, acceleration, deceleration, direction indicator display (on and off), wiper on and off, etc., of the wireless communication terminal 31 through wireless communication. In a case where the wireless communication terminal 31 includes a camera, the control system 2 may control the resolution, frame rate, orientation, etc., of the camera of the wireless communication terminal 31 through wireless communication.

The control system 2 may operate, through wireless communication, turning on and off, control flickering or display mode, etc., of a light-emitting unit (e.g., LED) for sending various information provided by the wireless communication terminal 31. The sending of information is used for, for example, alarm, alert, abnormality notification, or notification of the start, completion or execution of a process.

Furthermore, the control system 2 may operate the wireless communication terminal 31 through wireless communication to control the temperature of a specific part of the wireless communication terminal 31 or the temperature of a target object. The control system 2 may operate the wireless communication terminal 31 through wireless communication to control the AR or VR display which is updated according to a state of the environment or user.

The wireless communication system 1 may further include one or more surveillance cameras 32-1, 32-2, and 32-3. Each surveillance camera 32-1, 32-2, and 32-3 includes an image capture unit which generates an image of surroundings thereof. Each surveillance camera 32-1, 32-2, and 32-3 may perform wireless communication with the control system 2.

The control system 2 may control at least a part of the respective surveillance cameras 32-1, 32-2, and 32-3 through wireless communication. The control system 2 controls, for example, the resolution, frame rate, shutter speed, orientation, etc., of each surveillance camera 32-1, 32-2, and 32-3.

In the following description, a case where each wireless communication terminal 31 is an AMR will be mainly explained. The control system 2 operates movement of each wireless communication terminal 31 through wireless communication.

As illustrated in FIG. 1, each wireless communication terminal 31 realizes a specific task in a factory, warehouse, etc., by moving on an aisle 35, for example. In a part of the aisle 35, there is an area 37 in which the wireless communication state between the wireless communication terminal 31 and the base station 22 deteriorates due to attenuation of radio signals (i.e., radio waves) by an object 36. Thus, the communication between the wireless communication terminal 31 passing through the area 37 and the base station 22 may not be carried out correctly. The communication between the wireless communication terminal 31 and the base station 22 is referred to as direct communication. In the example illustrated in FIG. 1, it is predicted that the communication state of the direct communication between each of the wireless communication terminals 31-1 and 31-4 moving to the area 37 and the base station 22-1 will deteriorate.

In the wireless communication system 1, sidelink communication (SL communication) between two wireless communication terminals 31 may be used when it is predicted that the communication state of the direct communication deteriorates. SL communication is a communication between terminals without the control system 2 (more specifically, the base station 22-1) intervening in the communication.

Figure 2:
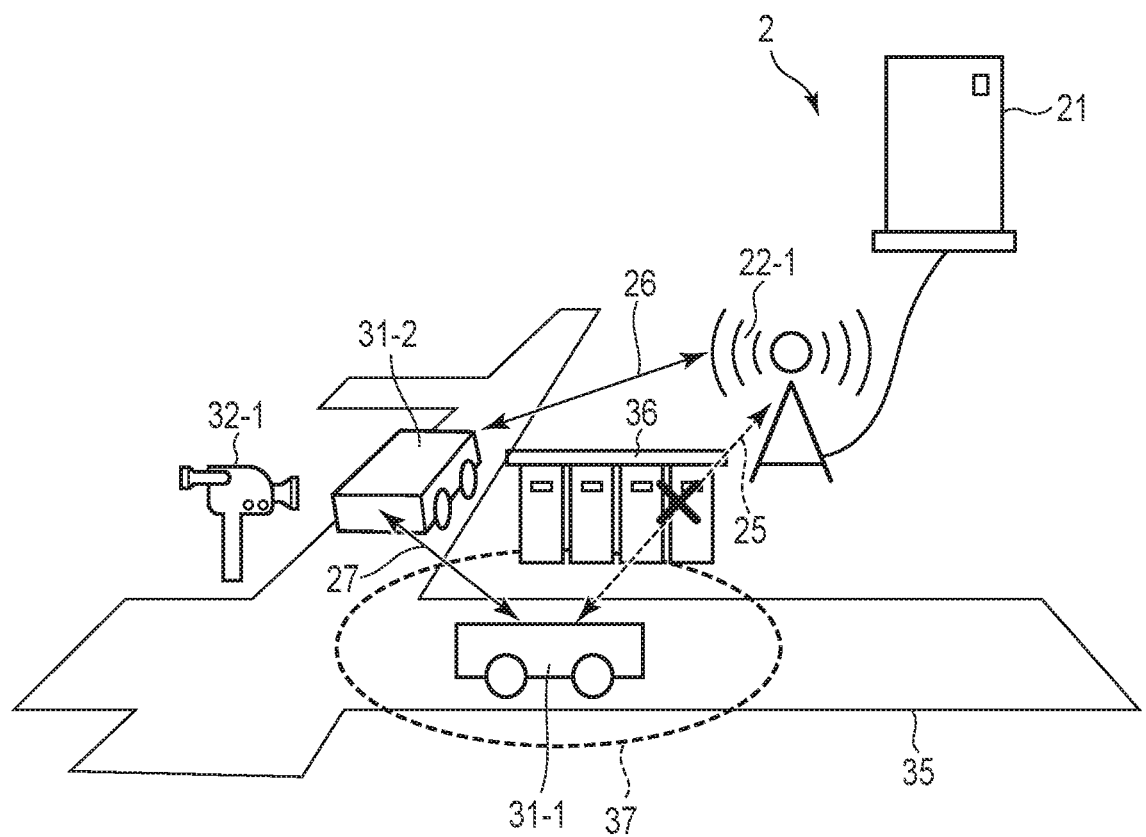
FIG. 2 is a diagram illustrating an example of direct communication and sidelink communication in the wireless communication system of FIG. 1.

FIG. 2 illustrates an example of direct communication and SL communication in the wireless communication system 1.

The first wireless communication terminal 31-1 and the base station 22-1 may establish a wireless link of direct communication 25. The second wireless communication terminal 31-2 and the base station 22-1 may establish a wireless link of direct communication 26. Furthermore, the first wireless communication terminal 31-1 and the second wireless communication terminal 31-2 may establish a wireless link of SL communication 27. The wireless links 25 and 26 may be referred to as Uu links. The wireless link 27 may be referred to as a sidelink or PC5 link.

The control system 2 operates movement of the first wireless communication terminal 31-1 via the wireless link 25 while the communication state of the wireless link 25 is good. Specifically, the control system 2 transmits an operation signal for the first wireless communication terminal 31-1 to the first wireless communication terminal 31-1 via the wireless link 25. The operation signal for the first wireless communication terminal 31-1 is, for example, a signal for operating movement of the first wireless communication terminal 31-1. The operation signal includes, for example, information indicating a position to which the corresponding wireless communication terminal 31 should move, a movement speed at which the terminal 31 should move, a movement direction in which the terminal 31 should move, etc.

The control system 2 controls movement of the second wireless communication terminal 31-2 via the wireless link 26 while the communication state of the wireless link 26 is good. Specifically, the control system 2 transmits an operation signal for the second wireless communication terminal 31-2 to the second wireless communication terminal 31-2 via the wireless link 26. The operation signal for the second wireless communication terminal 31-2 is, for example, a signal for operating movement of the second wireless communication terminal 31-2.

Furthermore, for example, while the first wireless communication terminal 31-1 is passing through the area 37, the communication state of the wireless link 25 may deteriorate due to attenuation of the radio signal caused by the object 36. When the communication state of the wireless link 25 deteriorates, the control system 2 controls movement of the first wireless communication terminal 31-1 via the wireless link 26 and the wireless link 27.

More specifically, the control system 2 transmits the operation signal for the first wireless communication terminal 31-1 to the second wireless communication terminal 31-2 via the wireless link 26. The second wireless communication terminal 31-2 receives the operation signal. Then, the second wireless communication terminal 31-2 transmits the received operation signal to the first wireless communication terminal 31-1 via the wireless link 27.

That is, the control system 2 makes the second wireless communication terminal 31-2 relay the transmission of the operation signal to the first wireless communication terminal 31-1. Note that not only a movable device such as the second wireless communication terminal 31-2, but also a fixed device such as the surveillance camera 32-1 may be used for relaying.

The wireless communication terminal 31 (the first wireless communication terminal 31-1 in FIG. 2) that is the final destination of the operation signal, may be referred to as a target terminal 31. The wireless communication terminal 31 (the second wireless communication terminal 31-2 in FIG. 2) that relays the operation signal to the target terminal 31 may be referred to as a relay terminal 31. The communication between the control system 2 and the target terminal 31 via the relay terminal 31 may be referred to as relay communication. The relay communication consists of the direct communication between the control system 2 and the relay terminal 31 (wireless link 26 in FIG. 2) and the SL communication between the relay terminal 31 and the target terminal 31 (wireless link 27 in FIG. 2).

Hereinafter, the configuration of the control system 2 and the configuration of the wireless communication terminal 31 will be explained, respectively.

(Control System)

FIG. 3 illustrates an example of the system configuration of the server 21 and the base station 22 that are included in the control system 2.

The server 21 includes, for example, a CPU 211, a RAM 212, a non-volatile memory 213, and a communication device 214. The CPU 211 executes various programs that are loaded into the RAM 212 from the non-volatile memory 213, which is a storage device. These programs include an operating system (OS) and various application programs. The application programs include a control program 212A. The control program 212A is a program for operating at least a part of each wireless communication terminal 31 in the wireless communication system 1 through wireless communication via the base station 22.

The communication device 214 is a device configured to perform wired communication. The communication device 214 includes a transmitter that transmits a signal (data) and a receiver that receives a signal. The communication device 214 may be a device configured to perform wireless communication.

The CPU 211 transmits a signal to the base station 22 via the communication device 214. The CPU 211 receives a signal from the base station 22 via the communication device 214.

As illustrated in FIG. 1, the server 21 may be connected to the multiple base stations 22-1 and 22-2. In that case, the CPU 211 may perform communication with each of the base stations 22-1 and 22-2 via the communication device 214.

The base station 22 includes, for example, a controller 221, a communication device 222, a wireless transmitter 223, and a wireless receiver 224.

The controller 221 controls the operation of each unit in the base station 22. The controller 221 may be realized as one or more processors, or as a circuit such as a system-on-a-chip (SoC).

The communication device 222 is a device configured to perform wired communication. The communication device 222 includes a transmitter that transmits a signal (data) and a receiver that receives a signal. The communication device 222 may be a device configured to perform wireless communication.

The controller 221 transmits a signal to the server 21 via the communication device 222. The controller 221 receives a signal from the server 21 via the communication device 222.

The wireless transmitter 223 is a transmitter circuit configured to transmit a radio signal. The wireless transmitter 223 includes, for example, a modulator, an antenna, and the like. The wireless transmitter 223 conforms to the 3GPP standard, for example. The wireless transmitter 223 transmits a signal to be transmitted to a wireless communication terminal 31, which is received from the server 21 via the communication device 222, to the wireless communication terminal 31.

The wireless receiver 224 is a receiver circuit configured to receive a radio signal. The wireless receiver 224 includes, for example, a demodulator, an antenna, and the like. The wireless receiver 224 conforms to the 3GPP standard, for example. The wireless receiver 224 receives a signal from the wireless communication terminal 31. The received signal may be transmitted to the server 21 via the communication device 222.

With the configuration illustrated in FIG. 3, the control system 2 is capable of transmitting, for example, a control signal, an operation signal, and a response signal to the wireless communication terminal 31. That is, the server 21 is capable of transmitting a control signal, an operation signal, and a response signal to the wireless communication terminal 31 via the base station 22.

The control signal is a signal for controlling the communication of the wireless communication terminal 31. The operation signal is a signal for operating at least a part of the wireless communication terminal 31, for example.

The response signal contains an ACK or a NACK. The ACK indicates that a device has received a signal and has acquired correct data from the signal. The NACK indicates that a device has received a signal but fails to acquire correct data from the signal.

The control system 2 is capable of receiving, for example, a control signal, a response signal, and a data signal from the wireless communication terminal 31. That is, the server 21 is capable of receiving a control signal, a response signal, and a data signal from the wireless communication terminal 31 via the base station 22.

The data signal received by the control system 2 is a data signal that includes, for example, information related to the operation of the wireless communication terminal 31 performed in response to the operation signal. The data signal includes, for example, sensing information related to movement of the wireless communication terminal 31 that is performed in response to the operation signal. The sensing information may include the position, speed, movement direction, etc., of the wireless communication terminal 31. Alternatively, the data signal may include information indicating that the wireless communication terminal 31 has completed movement that is performed in response to the operation signal.

Figure 4:
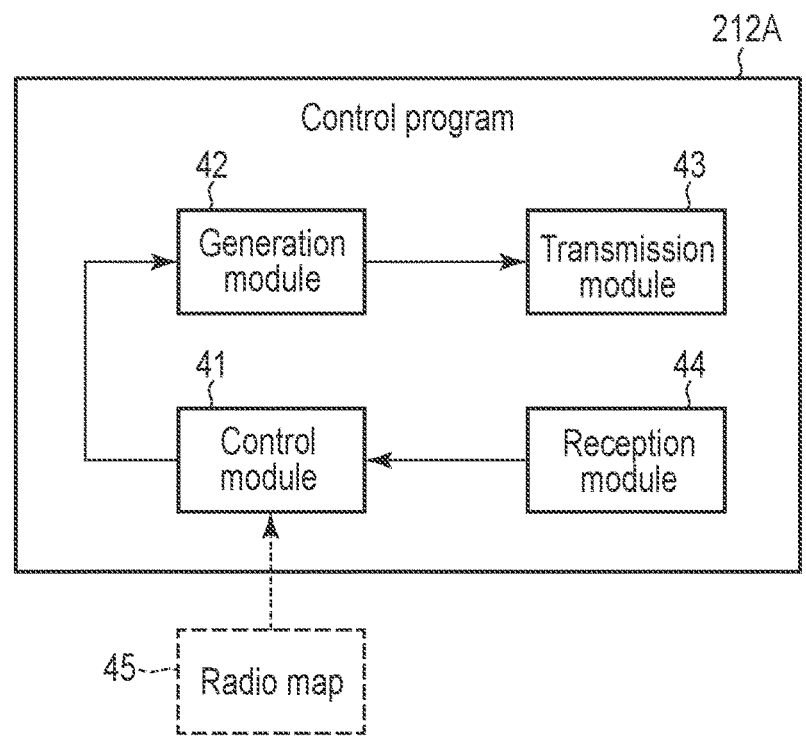
FIG. 4 is a block diagram illustrating a functional configuration example of a control program executed in the control system of the first embodiment.

FIG. 4 illustrates an example of the functional configuration of the control program 212A executed in the control system 2. The control program 212A is executed by, for example, the CPU 211 of the server 21. The control program 212A includes, for example, a control module 41, a generation module 42, a transmission module 43, and a reception module 44.

The control module 41 controls communication with each wireless communication terminal 31, and controls generation of an operation signal for operating at least a part of each wireless communication terminal 31.

The control module 41 controls, for example, a communication route according to at least one of the following: information related to movement of the wireless communication terminal 31; and the state of signal transmission and reception between the control system 2 and the wireless communication terminal 31.

Specifically, when the communication state of direct communication between the base station 22 and the wireless communication terminal 31 deteriorates, the control module 41 changes the communication between the base station 22 and the wireless communication terminal 31 to relay communication. The control module 41 selects another wireless communication terminal 31 (relay terminal) to be used for the relay communication between the base station 22 and the wireless communication terminal 31 (target terminal). That is, the control module 41 determines the route of the relay communication between the base station 22 and the wireless communication terminal 31 via the other wireless communication terminal 31. The method of selecting a relay terminal will be described later with reference to FIG. 7.

Furthermore, when the communication state of the direct communication between the base station 22 and the wireless communication terminal 31 is improved while the relay communication between the base station 22 and the wireless communication terminal 31 is being performed, the control module 41 changes the communication between the base station 22 and the wireless communication terminal 31 to direct communication.

The control module 41 maintains the direct communication between the base station 22 and the wireless communication terminal 31 while the communication state of the direct communication between the base station 22 and the wireless communication terminal 31 is good.

The generation module 42 generates a signal to be transmitted to the wireless communication terminal 31 in response to a request by the control module 41. The generation module 42 may generate a control signal, an operation signal, and a response signal. The control signal is, for example, a signal including information related to allocation of resources for direct communication, a signal including information related to allocation of resources for SL communication within relay communication, a signal instructing to transmission of a signal requesting terminal-to-terminal communication between a destination wireless communication terminal 31 and another wireless communication terminal 31. The resources include, for example, time and frequency band (channel). The signal requesting terminal-to-terminal communication between a destination wireless communication terminal 31 (relay terminal 31) and another wireless communication terminal 31 (target terminal 31) may be referred to as an SLReq signal. The signal instructing transmission of an SLReq signal may be referred to as an SLReq instruction signal. The SLReq instruction signal includes identification information of the target terminal 31 with which the terminal-to-terminal communication should be performed.

The transmission module 43 transmits a signal generated by the generation module 42 to the wireless communication terminal 31. Specifically, the transmission module 43 transmits the signal to the wireless communication terminal 31 via, for example, the communication device 214 of the server 21, and the communication device 222 and the wireless transmitter 223 of the base station 22. The transmitted signal reaches the wireless communication terminal 31 in the route determined by the control module 41.

The reception module 44 receives a signal transmitted by the wireless communication terminal 31. Specifically, the reception module 44 receives the signal from the wireless communication terminal 31 via, for example, the wireless receiver 224 and the communication device 222 of the base station 22 and the communication device 214 of the server 21. The reception module 44 sends the received signal to the control module 41. The reception module 44 may receive, for example, a control signal, a response signal, and a data signal. The control signal is, for example, an SLReq signal.

The terminal-to-terminal communication between the relay terminal 31 and the target terminal 31 that may be started by an SLReq instruction signal is defined as including transmitting one or more operation signals for operating at least a part of the target terminal 31, which are transmitted from the server 21 to the relay terminal 31 via the base station 22, from the relay terminal 31 to the target terminal 31. A function of a wireless communication terminal 31 to transmit one or more operation signals for operating at least a part of another wireless communication terminal 31 (target terminal 31), which are transmitted from the server 21 to the wireless communication terminal 31 via the base station 22, to the target terminal 31 may be referred to as a relay function. The control module 41 may confirm whether or not a wireless communication terminal 31 supports the relay function by using the generation module 42, the transmission module 43, and the reception module 44.

Specifically, the control module 41 attempts to transmit an SLReq instruction signal to the wireless communication terminal 31 via the base station 22 by using the generation module 42 and the transmission module 43, for example. Then, if the reception module 44 receives an SLReq signal from the wireless communication terminal 31, the control module 41 determines that the wireless communication terminal 31 supports the relay function.

Alternatively, in a case where the control system 2 (base station 22) and each wireless communication terminal 31 exchange capabilities (e.g., whether various functions are supported or not), the control module 41 may confirm the capability of the relay function in each wireless communication terminal 31.

When an SLReq signal is received by the reception module 44, the control module 41 allocates resources for SL communication requested by the SLReq signal. The control module 41 makes the generation module 42 generate a control signal that includes information indicative of the allocated resources. The transmission module 43 transmits the generated control signal to the wireless communication terminal 31 that transmitted the SLReq signal.

Furthermore, the control module 41 may change the communication route between the control system 2 and the wireless communication terminal 31 according to at least one of a response signal or a data signal received by the reception module 44.

Here, an operation of the control module 41 to control the communication route between the base station 22 and a wireless communication terminal 31 will be described. It is assumed that a case where the first wireless communication terminal 31-1 is a target terminal and the second wireless communication terminal 31-2 is a relay terminal.

The control module 41 determines to use relay communication for communication with the first wireless communication terminal 31-1 by using, for example, at least one of information related to movement of the first wireless communication terminal 31-1 or the communication state between the first wireless communication terminal 31-1 and the control system 2. That is, the control module 41 determines to transmit an SLReq instruction signal and an operation signal for the first wireless communication terminal 31-1 to the second wireless communication terminal 31-2 that is a relay terminal, by using at least one of the information related to movement of the first wireless communication terminal 31-1 or the communication state between the first wireless communication terminal and the control system 2.

Alternatively, the control module 41 determines to use relay communication for the communication with the first wireless communication terminal 31-1 by using, for example, at least one of information related to movement of the first wireless communication terminal 31-1, communication state between the first wireless communication terminal and the control system 2, information related to movement of the second wireless communication terminal 31-2, or communication state between the second wireless communication terminal 31-2 and the control system 2. That is, the control module 41 determines to transmit an SLReq instruction signal and an operation signal for the first wireless communication terminal 31-1 to the second wireless communication terminal 31-2 which is a relay terminal, by using at least one of the information related to movement of the first wireless communication terminal 31-1, the communication state between the first wireless communication terminal and the control system 2, the information related to movement of the second wireless communication terminal 31-2, or the communication state between the second wireless communication terminal 31-2 and the control system 2.

In the following description, several specific examples where the control module 41 controls a communication route between the base station 22 and the first wireless communication terminal 31-1 will be explained.

(Example of Using Signal Transmission/Reception State)

The control module 41 determines whether to use direct communication or relay communication for communication with the wireless communication terminal 31 in accordance with the state of signal transmission and reception between the base station 22 and the wireless communication terminal 31.

The control module 41 determines to switch the communication with the wireless communication terminal 31 to relay communication when the state of signal transmission and reception is deteriorating during direct communication between the base station 22 and the wireless communication terminal 31, or when the state of signal transmission and reception is likely to deteriorate in future. The control module 41 determines to switch the communication with the wireless communication terminal 31 to relay communication if at least one of the following conditions is satisfied within the last first period: a NACK is received from the wireless communication terminal 31; a NACK is transmitted to the wireless communication terminal 31; the number of times a NACK is received from the wireless communication terminal 31 exceeds a threshold; the number of times a NACK is transmitted to the wireless communication terminal 31 exceeds a threshold; a ratio of NACKs among response signals received from the wireless communication terminal 31 exceeds a threshold; a ratio of NACKs among response signals transmitted to the wireless communication terminal 31 exceeds a threshold; the power of a signal received from the wireless communication terminal 31 (received power) is less than a threshold; the number of times a signal whose received power is less than a first threshold is received from the wireless communication terminal 31 exceeds a second threshold; and a ratio of the number of times that a signal whose received power is less than a first threshold is received among the number of times that a signal is received from the wireless communication terminal 31 exceeds a second threshold. The control module 41 may determine whether to switch the communication with the wireless communication terminal 31 to relay communication on the basis of various conditions such as a combination of one or more of the above conditions.

The control module 41 determines whether to switch the communication with the wireless communication terminal 31 (target terminal 31) to direct communication or to maintain relay communication according to the state of signal transmission and reception between the base station 22 and the target terminal 31 while the relay communication between the base station 22 and the target terminal 31 via another wireless communication terminal 31 (relay terminal 31) is being performed. The control module 41 determines to switch the communication with the target terminal 31 to direct communication when the state of signal transmission and reception between the base station 22 and the target terminal 31 is improved. If the state of signal transmission and reception between the base station 22 and the target terminal 31 is not improved, the control module 41 determines to maintain the relay communication as the communication with the target terminal 31.

Specifically, for example, when the control module 41 received at least one of a response signal and a data signal transmitted by the target terminal 31 within the last first period, the control module 41 determines whether to switch the communication with the target terminal 31 to direct communication or to maintain the communication in relay communication according to the at least one of the response signal and the data signal received. That is, the control module 41 determines whether a new operation signal for the target terminal 31 is transmitted to the relay terminal 31 for the relay communication or to the target terminal 31 through the direct communication according to the at least one of the response signal and the data signal received. Note that the response signal and the data signal are signals transmitted by the target terminal 31 and received by the control system 2 without being relayed by the relay terminal 31.

For example, the control module 41 may determine to switch the communication with the target terminal 31 to direct communication if at least one of the following conditions is satisfied within the last first period: at least one of a response signal or a data signal is received from the target terminal 31; the number of times a response signal is received from the target terminal 31 exceeds a threshold; the number of times a data signal is received from the target terminal 31 exceeds a threshold; a sum of the number of times a response signal is received from the target terminal 31 and the number of times a data signal is received from the target terminal 31 exceeds a threshold; the power of a signal received from the target terminal 31 (received power) is equal to or more than a threshold; the number of times a signal whose received power is equal to or greater than a first threshold is received from the target terminal 31 exceeds a second threshold; and a ratio of the number of times a signal whose received power is equal to or greater than a first threshold is received among the number of times a signal is received from the target terminal 31 exceeds a second threshold. That is, the control module 41 determines that a new operation signal for the target terminal 31 is transmitted to the target terminal 31 through direct communication. The control module 41 may determine whether to switch the communication with the target terminal 31 to direct communication on the basis of various conditions such as a combination of one or more of the above conditions.

Furthermore, the control module 41 determines to maintain relay communication as communication with the target terminal 31 if neither a response signal nor a data signal has been received from the target terminal 31 within the last first period, for example. That is, the control module 41 determines to transmit a new operation signal for the target terminal 31 to the relay terminal 31 for relay communication if neither a response signal nor a data signal has been received from the target terminal 31.

Furthermore, the control module 41 determines to maintain direct communication with the wireless communication terminal 31 if signal transmission and reception state between the base station 22 and the wireless communication terminal 31 is good while the direct communication between the base station 22 and the wireless communication terminal 31 is being performed. The control system 2 determines to maintain the direct communication with the wireless communication terminal 31 if at least one of the following conditions is satisfied within the last first period: an ACK is received from the wireless communication terminal 31; an ACK is transmitted to the wireless communication terminal 31; the number of times an ACK is received from the wireless communication terminal 31 exceeds a threshold; the number of times an ACK is transmitted to the wireless communication terminal 31 exceeds a threshold; a ratio of ACKs among response signals received from the wireless communication terminal 31 exceeds a threshold; a ratio of ACKs among signals transmitted to the wireless communication terminal 31 exceeds a threshold; the power of a signal received from the wireless communication terminal 31 (received power) exceeds a threshold, the number of times a signal whose received power is equal to or greater than a first threshold is received from the wireless communication terminal 31 exceeds a second threshold; and a ratio of the number of times a signal whose received power is equal to or greater than a first threshold is received among the number of times a signal is received from the wireless communication terminal 31 exceeds a second threshold. The control module 41 determines to maintain the direct communication with the wireless communication terminal 31 on the basis of various conditions such as a combination of one or more of the above conditions.

(Example of Using Information Related to Movement of Wireless Communication Terminal)

The control module 41 determines whether to use direct communication or relay communication for communication between the base station 22 and the wireless communication terminal 31 by using the information related to movement of the wireless communication terminal 31 and a radio map 45. The information related to movement of the wireless communication terminal 31 includes, for example, information indicating at least one of a position, speed, or movement direction of the wireless communication terminal 31.

The radio map 45 indicates, for example, the communication state by the control system 2 for each of areas that are obtained by dividing a space in which the wireless communication terminal 31 may be operated, by a specific size. The radio map 45 may be obtained beforehand, or it may be generated and updated during the operation of the wireless communication system 1. Alternatively, use of the radio map 45 may be started on the basis of data acquired beforehand, and if signals are transmitted to and received from the wireless communication terminal 31 in a specific area during the operation, the communication state of the specific area in the radio map 45 may be updated on the basis of the result of the transmission and reception of the signals.

Specifically, the radio map 45 includes, for each of the areas, a value indicating a possibility (e.g., probability) that a radio signal transmitted by the control system 2 (specifically, the base station 22) correctly reaches the area. The radio map 45 may also include, for each of the areas, a value indicating a possibility that a radio signal transmitted by a wireless communication terminal 31 located in the area correctly reaches the control system 2 (specifically, the base station 22). Alternatively, the radio map 45 may include, for each of the areas, a value into which the possibility that a radio signal transmitted by the control module 41 correctly reaches the area and the possibility that a radio signal transmitted by a wireless communication terminal 31 located in the area correctly reaches the control system 2 are integrated.

Note that the radio map 45 may include, for each of the areas, a value indicating a possibility that a radio signal transmitted by the control system 2 does not correctly reach the area (hereinafter referred to as error rate). The radio map 45 may also include, for each of the areas, a value indicating a possibility that a radio signal transmitted by the wireless communication terminal 31 located in the area does not correctly reach the control system 2. Alternatively, for each of the areas, the radio map 45 may include a value into which the possibility that a radio signal transmitted by the control system 2 does not correctly reach the area and the possibility that a radio signal transmitted by the wireless communication terminal 31 located in the area does not correctly reach the control system 2 are integrated.

The control module 41 also manages the position of each wireless communication terminal 31. For example, the position, speed, direction of movement, and other information sensed by the wireless communication terminal 31 and transmitted to the control system 2 are used to manage the position of each wireless communication terminal 31. Furthermore, information indicating that a wireless communication terminal 31 has completed an operation corresponding to an operation signal received from the control system 2 may be used to manage the position of the wireless communication terminal 31. When the control module 41 receives, from the wireless communication terminal 31, information indicating that the wireless communication terminal 31 has completed the operation corresponding to the operation signal, the control module 41 can estimate that the wireless communication terminal 31 exists at the position specified by the operation signal.

Furthermore, the control module 41 may calculate the position of each wireless communication terminal 31 by processing images acquired by cameras mounted on the wireless communication terminals 31 and images acquired by the surveillance cameras 32-1, 32-2, and 32-3. Note that, the control system 2 is capable of identifying each of the wireless communication terminals 31 by using the appearance captured in the image. Each wireless communication terminal 31 includes, for example, a unique feature that can be recognized from its appearance (e.g., shape, mark, character, color, etc.).

Furthermore, the control module 41 may estimate the position of the wireless communication terminal 31 on the basis of which base station 22 transmitted the radio beam that the wireless communication terminal 31 received well.

In a case where a wireless communication terminal 31 moves to an area on the radio map 45 where the communication state with the control system 2 is bad while direction communication between the base station 22 and the wireless communication terminal 31 is being performed, the control module 41 determines to switch the communication with the wireless communication terminal 31 to relay communication. The case where the wireless communication terminal 31 moves to the area where the communication state is bad may include a case where the wireless communication terminal 31 has already entered the area and a case where the wireless communication terminal 31 is likely to move to the area within a specific time period. The control module 41 may determine that the wireless communication terminal 31 moves to the area in a bad communication state with the control system 2 when the location of the wireless communication terminal 31 is within an area on the radio map 45 whose error rate exceeds a threshold, or when the distance between the position of the wireless communication terminal 31 and the area on the radio map 45 whose error rate exceeds a first threshold is less than a second threshold, for example. Alternatively, when the distance between the position of the wireless communication terminal 31 and an area on the radio map 45 whose error rate exceeds a first threshold is less than a second threshold, and the direction of movement of the wireless communication terminal 31 is toward the area, the control module 41 may determine that the wireless communication terminal 31 moves to the area in the bad communication state with the control system 2.

In a case where a wireless communication terminal 31 moves to an area (position) on the radio map 45 where the communication state with the control system 2 is good while relay communication between the base station 22 and the wireless communication terminal 31 is being performed, the control module 41 determines to switch the communication with the wireless communication terminal 31 to direct communication. The case where the wireless communication terminal 31 moves to the area where the communication state is good may include a case where the wireless communication terminal 31 has already entered the area and a case where the wireless communication terminal 31 is likely to move to the area within a specific time period. For example, when the position of the wireless communication terminal 31 is within an area on the radio map 45 whose error rate is equal to or less than a threshold, or when the distance between the position of the wireless communication terminal 31 and an area on the radio map 45 whose error rate is equal to or less than a first threshold is less than a second threshold, the control module 41 may determine that the wireless communication terminal 31 moves to the area where the communication state with the control system 2 is good. Furthermore, the control module 41 may determine that the wireless communication terminal 31 moves to the area where the communication state with the control system 2 is good when the distance between the position of the wireless communication terminal 31 and an area on the radio map 45 whose error rate is equal to or less than a first threshold is less than a second threshold and the direction of movement of the wireless communication terminal 31 is toward the area.

Furthermore, the control module 41 determines to maintain direct communication with a wireless communication terminal 31 when the wireless communication terminal 31 is in an area on the radio map 45 where the communication state with the control system 2 is good while the direct communication between the base station 22 and the wireless communication terminal 31 is being performed. The control module 41 may determine that the wireless communication terminal 31 is in an area where the communication state with the control system 2 is good when the position of the wireless communication terminal 31 is within the area on the radio map 45 whose error rate is equal to or less than a threshold.

The control module 41 may control a communication route between the base station 22 and a wireless communication terminal 31 in further consideration of the frequency of transmission of operation signals from the control system 2 to the wireless communication terminal 31. For example, the control module 41 may perform determination of switching the communication route frequently in a case where an operation signal is transmitted at a high frequency in order to precisely control moving distance, movement speed, movement direction, etc., of the wireless communication terminal 31.

(Wireless Communication Terminal)

Figure 5:
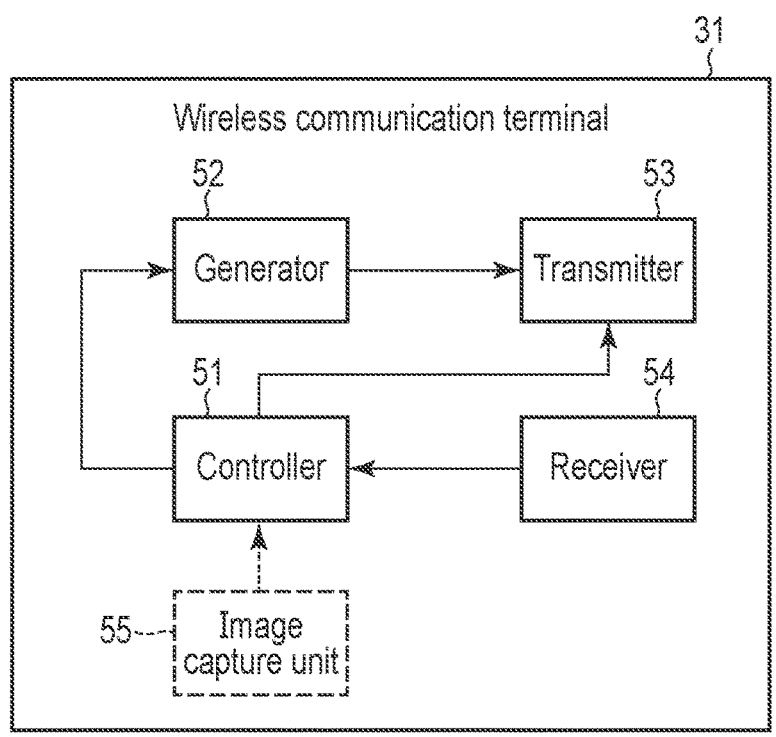
FIG. 5 is a block diagram illustrating a configuration example of a wireless communication terminal in the wireless communication system of FIG. 1.

FIG. 5 illustrates a configuration example of the wireless communication terminal 31. The wireless communication terminal 31 includes, for example, a controller 51, a generator 52, a transmitter 53, and a receiver 54. The controller 51, the generator 52, the transmitter 53, and the receiver 54 may be realized as, for example, a circuit.

The controller 51 controls the operation of each unit in the wireless communication terminal 31. The controller 221 may be realized as one or more processors, or as a circuit such as an SoC.

The generator 52 generates a signal to be transmitted to the control system 2 (specifically, the base station 22) or another wireless communication terminal 31 in response to a request by the controller 51. The generator 52 may generate a control signal, a response signal, and a data signal. The control signal is, for example, an SLReq signal, a signal containing information related to the allocation of resources used for SL communication, and the like.

The transmitter 53 is a transmitter circuit configured to transmit a radio signal. The transmitter 53 includes, for example, a modulator, an antenna, etc. The transmitter 53 conforms to the 3GPP standard, for example. The transmitter 53 transmits a signal generated by the generator 52 to the control system 2 (base station 22) or another wireless communication terminal 31. Specifically, the transmitter 53 may transmit the signal to the control system 2 through direct communication with the control system 2. The transmitter 53 may transmit the signal to the control system 2 through relay communication with the control system 2 via the other wireless communication terminal 31. Furthermore, the transmitter 53 may transmit the signal to the other wireless communication terminal 31 through SL communication with the other wireless communication terminal 31. The signal to be transmitted is, for example, a control signal, a data signal, a response signal, etc.

The receiver 54 is a receiver circuit configured to receive a radio signal. The receiver 54 includes, for example, a demodulator, an antenna, etc. The receiver 54 conforms to 3GPP standard, for example. The receiver 54 receives a signal from the control system 2 (base station 22) or another wireless communication terminal 31. Specifically, the receiver 54 may receive the signal from the control system 2 through direct communication with the control system 2. The receiver 54 may receive the signal from the control system 2 through relay communication with the control system 2 via the other wireless communication terminal 31. The receiver 54 may receive the signal from the other wireless communication terminal 31 through SL communication with the other wireless communication terminal 31. The received signal is, for example, a control signal, an operation signal, a data signal, a response signal, and the like. The received signal is sent to, for example, the controller 51.

The controller 51 may control the operation of each unit in the wireless communication terminal 31 according to the signal received by the receiver 54. Examples of operations according to the content of the received signal will be described below.

(When SLReq Instruction Signal is Received)

When a signal received by the receiver 54 is an SLReq instruction signal for the wireless communication terminal 31, the controller 51 transmits an SLReq signal to the control system 2 through the generator 52 and the transmitter 53. Specifically, the controller 51 requests the generator 52 to generate an SLReq signal. The generator 52 generates an SLReq signal in response to the request. Then, the transmitter 53 transmits the generated SLReq signal to the control system 2.

Note that, the SLReq instruction signal includes the identification information of another wireless communication terminal 31 with which SL communication should be performed (i.e., target terminal 31). The controller 51 may determine whether to transmit an SLReq signal requesting SL communication with the target terminal 31 to the control system 2 by using movement information related to any of the position, movement direction and speed of each wireless communication terminal 31. The controller 51 determines whether the SL communication is possible or not according to whether a signal transmitted to the control system 2 or other terminals by the target terminal 31 is received or not, and transmits an SLReq signal to the control system 2 if it is possible.

Alternatively, the controller 51 may use an image captured by an image capture unit 55 to determine whether to transmit an SLReq signal to the control system 2. The image capture unit 55 may be built into the wireless communication terminal 31, or may be mounted on the wireless communication terminal 31 and connected thereto in a wired or wireless manner. For example, the controller 51 transmits an SLReq signal to the control system 2 when the image captured by the image capture unit 55 includes the target terminal 31 with which SL communication should be performed.

(When Operation Signal is Received)

When a signal received by the receiver 54 is an operation signal for the wireless communication terminal 31, the controller 51 operates at least a part of the wireless communication terminal 31 according to the operation signal.

When a signal received by the receiver 54 is an operation signal for another wireless communication terminal 31 (target terminal 31), the controller 51 transmits the operation signal to the target terminal 31 through the transmitter 53. That is, when the operation signal for the target terminal 31 is transmitted through relay communication using the wireless communication terminal 31 as a relay terminal, the controller 51 transmits the operation signal to the target terminal 31 through SL communication using the transmitter 53.

The controller 51 may make the generator 52 process the received operation signal so that it is suitable for transmission in SL communication with the target terminal 31 as the destination. The transmitter 53 transmits the operation signal processed by the generator 52 to the target terminal 31.

With the configuration of the control system 2 and the wireless communication terminal 31 described above with reference to FIGS. 3 to 5, the control system 2 can transmit/receive signals to/from the wireless communication terminal 31 through either direct communication or relay communication that is switched according to the communication state with the wireless communication terminal 31.

Next, referring to FIGS. 6 to 9, examples of processing sequences in a wireless communication system of a comparative example and in the wireless communication system 1 of the present embodiment will be described, respectively.

Figure 6:
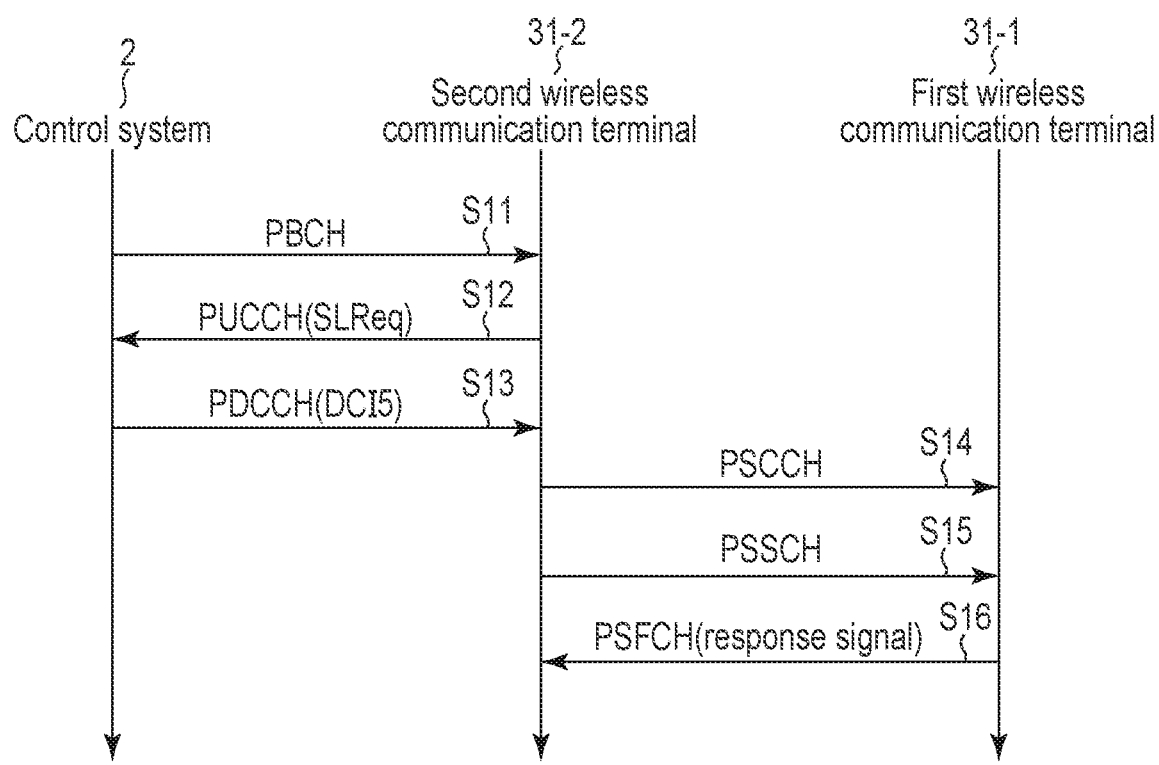
FIG. 6 is a diagram illustrating an example of a processing sequence in a wireless communication system of a comparative example.

FIG. 6 illustrates an example of a processing sequence performed in the wireless communication system of the comparative example. This processing sequence illustrates a case where SL communication between the first wireless communication terminal 31-1 and the second wireless communication terminal 31-2 is performed.

First, the control system 2 transmits a signal containing information related to SL communication to the second wireless communication terminal 31-2 through Physical Broadcast Channel (PBCH) (S11). The information related to SL communication includes, for example, information related to wireless settings for the SL communication.

After that, the second wireless communication terminal 31-2 transmits a sidelink request signal (SLReq signal) to the control system 2 through Physical Uplink Control Channel (PUCCH) (S12). The second wireless communication terminal 31-2 transmits the SLReq signal to the control system 2 when data should be transmitted to the first wireless communication terminal 31-1 through the SL communication, for example. The SLReq signal is a signal that requests SL communication with the first wireless communication terminal 31-1.

In response to receiving the SLReq signal, the control system 2 allocates resources for the SL communication, and transmits a signal containing downlink control information (DCI5) to the second wireless communication terminal 31-2 through Physical Downlink Control Channel (PDCCH) (S13). The downlink control information includes information indicating the resources allocated for the SL communication. The resources includes, for example, time and frequency band.

The second wireless communication terminal 31-2 receives the signal that contains the downlink control information. The second wireless communication terminal 31-2 performs the SL communication with the first wireless communication terminal 31-1 according to the time and frequency band indicated in the downlink control information.

Specifically, first, the second wireless communication terminal 31-2 transmits a signal containing information related to the wireless settings for SL communication and the allocated resources to the first wireless communication terminal 31-1 through Physical Sidelink Control Channel (PSCCH) (S14). Next, the second wireless communication terminal 31-2 transmits a signal containing data to the first wireless communication terminal 31-1 through Physical Sidelink Shared Channel (PSSCH) (S15).

In response to receiving the signal through PSSCH, the first wireless communication terminal 31-1 transmits a response signal to the second wireless communication terminal 31-2 through Physical Sidelink Feedback Channel (PSFCH) (S16). Note that PSCCH, PSSCH and PSFCH are channels used in SL communication.

With the processing sequence illustrated in FIG. 6, the second wireless communication terminal 31-2 performs SL communication with the first wireless communication terminal 31-1. In this processing sequence, the SL communication between the two wireless communication terminals 31-1 and 31-2 is started by the second wireless communication terminal 31-2 transmitting the SLReq signal to the control system 2 (i.e., triggered by the SLReq signal). That is, the start of the SL communication is determined by the second wireless communication terminal 31-2. Therefore, although the control system 2 can change the allocation of resources used for the SL communication, for example, it cannot make the wireless communication terminals 31-1 and 31-2 start the SL communication or terminate the SL communication that has been started.

In contrast, in the wireless communication system 1 of the present embodiment, the control system 2 determines start of SL communication between two wireless communication terminals 31. For example, when the communication state of direct communication between the first wireless communication terminal 31-1 and the control system 2 (base station 22-1) deteriorates, the control system 2 starts the SL communication between the second wireless communication terminal 31-2 and the first wireless communication terminal 31-1. Specifically, the control system 2 transmits an SLReq instruction signal to the second wireless communication terminal 31-2 (i.e., using the SLReq instruction signal as a trigger), thereby instructing the second wireless communication terminal 31-2 to start SL communication with the first wireless communication terminal 31-1. Thus, the control system 2 can executes relay communication with the first wireless communication terminal 31-1 via the second wireless communication terminal 31-2 when the communication state of direct communication with the first wireless communication terminal 31-1 deteriorates. The control system 2 transmits an operation signal for operating movement of the first wireless communication terminal 31-1 to the first wireless communication terminal 31-1 through relay communication, thereby stably operating the first wireless communication terminal 31-1.

Furthermore, the control system 2 also determines termination of the SL communication. When the communication state of direct communication between the first wireless communication terminal 31-1 and the control system 2 that has been deteriorating is improved, the control system 2 terminates the SL communication between the first wireless communication terminal 31-1 and the second wireless communication terminal 31-2. Consequently, the control system 2 can resume the direct communication with the first wireless communication terminal 31-1 when the communication state of the direct communication with the first wireless communication terminal 31-1 is improved.

Therefore, the control system 2 can deliver an operation signal for the first wireless communication terminal 31-1 to operate movement of the first wireless communication terminal 31-1 through either direct communication or relay communication. Accordingly, the control system 2 can operate the first wireless communication terminal 31-1 stably.

As above, the control system 2 can not only manage resources used by each wireless communication terminal 31 for SL communication, but also control whether to perform direct communication or relay communication with each wireless communication terminal 31. That is, in the wireless communication system of the comparative example, the wireless communication terminal 31 leads the start and end of the SL communication, while in the wireless communication system 1 of the present embodiment, the control system 2 leads the start and end of the SL communication.

Figure 7:
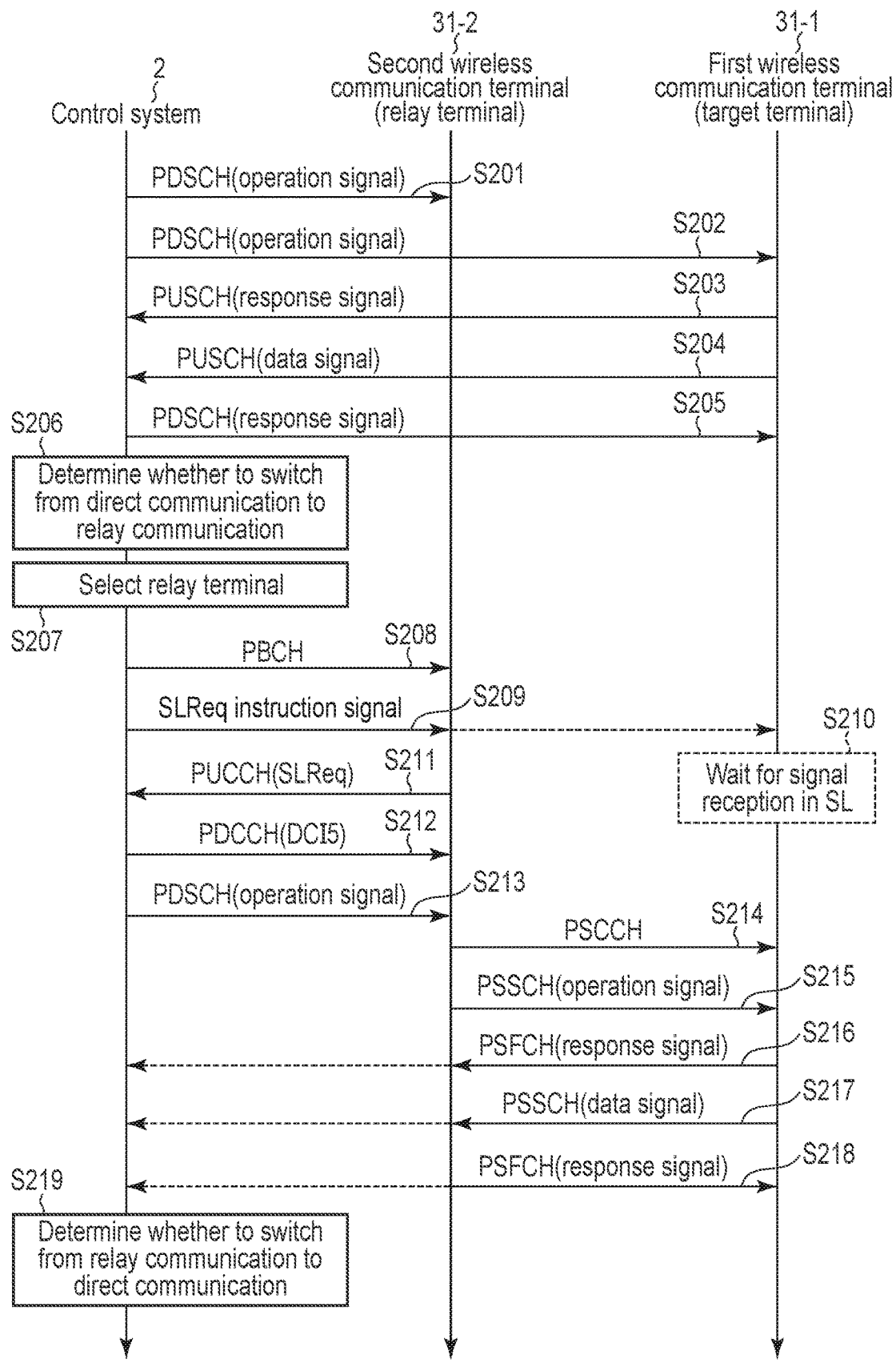
FIG. 7 is a diagram illustrating a first example of a processing sequence in the wireless communication system of FIG. 1.

FIG. 7 illustrates a first example of a processing sequence in the wireless communication system 1 of the present embodiment. In this processing sequence, after direct communication between the control system 2 and each of the wireless communication terminals 31-1 and 31-2 is performed, relay communication between the control system 2 and the first wireless communication terminal 31-1 (target terminal) via the second wireless communication terminal 31-2 (relay terminal) is performed.

First, the control system 2 transmits an operation signal for the second wireless communication terminal 31-2 to the second wireless communication terminal 31-2 through Physical Downlink Shared Channel (PDSCH) (S201). The operation signal for the second wireless communication terminal 31-2 is a signal for operating at least a part of the second wireless communication terminal 31-2 (e.g., a signal for moving the second wireless communication terminal 31-2).

Next, the control system 2 transmits an operation signal for the first wireless communication terminal 31-1 to the first wireless communication terminal 31-1 through PDSCH (S202). The operation signal for the first wireless communication terminal 31-1 is a signal for operating at least a part of the first wireless communication terminal 31-1 (e.g., a signal for moving the first wireless communication terminal 31-1).

The first wireless communication terminal 31-1 receives the operation signal, and returns a response signal to the operation signal to the control system 2 through PUSCH (S203). Then, the first wireless communication terminal 31-1 transmits a data signal to the control system 2 (S204).

The control system 2 receives the data signal, and returns a response signal to the data signal to the first wireless communication terminal 31-1 through PDSCH (S205). Note that signal transmission and reception similar to S203 to S205 may be performed between the control system 2 and the second wireless communication terminal 31-2.

Next, the control system 2 determines whether to switch the communication with the first wireless communication terminal 31-1 from direct communication to relay communication (S206). The control system 2 determines to switch the communication with the first wireless communication terminal 31-1 from direct communication to relay communication when, for example, the state of signal transmission and reception with the first wireless communication terminal 31-1 deteriorates. For example, when the control system 2 has not received at least one of the response signal of S203 and the data signal of S204, when the control system 2 has requested the first wireless communication terminal 31-1 to retransmit at least one of the response signal of S203 and the data signal of S204, or when the control system 2 has retransmitted at least one of the operation signal of S202 and the response signal of S205 (for example, when the response signal of S203 contains a NAK), the control system 2 determines that the state of signal transmission and reception with the first wireless communication terminal 31-1 deteriorates.

Furthermore, the control system 2 may use the radio map 45 and information related to movement of the first wireless communication terminal 31-1 to determine whether to switch the communication with the first wireless communication terminal 31-1 from direct communication to relay communication. The information related to movement of the first wireless communication terminal 31-1 includes, for example, information indicating at least one of the position, speed, or movement direction of the first wireless communication terminal 31-1. The control system 2 determines, for example, that the state of signal transmission and reception with the first wireless communication terminal 31-1 deteriorates when it is estimated that the first wireless communication terminal 31-1 enters an area on the radio map 45 where the communication state with the control system 2 is poor.

In the following, a case where the control system 2 determines that the state of signal transmission and reception with the first wireless communication terminal 31-1 deteriorates and switches the communication with the first wireless communication terminal 31-1 to relay communication is illustrated.

The control system 2 selects a relay terminal that relays the communication between the control system 2 and the first wireless communication terminal 31-1 (S207). The control system 2 selects the second wireless communication terminal 31-2 as a relay terminal, for example.

The relay terminal is a wireless communication terminal 31 that has a good communication state through direct communication with the control system 2, and is capable of SL communication with the first wireless communication terminal 31-1. The control system 2 selects a relay terminal that relays the communication between the control system 2 and the first wireless communication terminal 31-1 by using the radio map 45 and information related to movement of each wireless communication terminal 31. The information related to movement of each wireless communication terminal 31 includes, for example, information indicating at least one of the position, speed, or movement direction of the wireless communication terminal 31. For example, the control system 2 selects a wireless communication terminal 31 as a relay terminal when the wireless communication terminal 31 is located in an area on the radio map 45 where the communication state with the control system 2 is good and the distance between the wireless communication terminal 31 and the first wireless communication terminal 31-1 is less than a threshold. The area where the communication state with the control system 2 is good is, for example, an area on the radio map 45 in which the error rate is less than a threshold.

The control system 2 may select a relay terminal using an image captured by the image capture unit 55 of each wireless communication terminal 31. Specifically, the image capture unit 55 of each wireless communication terminal 31 generates an image of the surroundings of the corresponding wireless communication terminal 31. Each wireless communication terminal 31 transmits the generated image to the control system 2. The control system 2 processes the image received from each wireless communication terminal 31 to determine whether or not the image includes the first wireless communication terminal 31-1. The control system 2 selects the wireless communication terminal 31 that acquired the image including the first wireless communication terminal 31-1 as the relay terminal.

Note that, when multiple wireless communication terminals 31 are capable of being selected as a relay terminal, the control system 2 selects a wireless communication terminal 31 whose communication states of direct communication with the control system 2 and SL communication with the first wireless communication terminal 31-1 are estimated to be better. For example, the control system 2 selects, as a relay terminal, a wireless communication terminal 31 that is closer to the first wireless communication terminal 31-1, or a wireless communication terminal 31 that acquired an image in which the first wireless communication terminal 31-1 is included larger, from the multiple wireless communication terminals 31 that are capable of being selected as a relay terminal. The control system 2 may select a relay terminal by considering that the direction of movement of each wireless communication terminal 31 is the same. Since there are many variations in the conditions for the selection of the relay terminal by the control system 2, the control system 2 may select a relay terminal by combining one or more of the conditions described above.

Before selecting a relay terminal, the control system 2 may confirm whether or not each wireless communication terminal 31 has the relay function. The control system 2 can determine whether or not a wireless communication terminal 31 has the relay function by, for example, attempting to transmit an SLReq instruction signal to the wireless communication terminal 31 or by exchanging information related to capabilities with the wireless communication terminal 31.

The control system 2 transmits a signal including information related to SL communication to the selected second wireless communication terminal 31-2 through PBCH (S208). Then, the control system 2 transmits an SLReq instruction signal to the second wireless communication terminal 31-2 by, for example, unicast through PDSCH (S209). That is, the SLReq instruction signal whose destination is the second wireless communication terminal 31-2 is transmitted. The SLReq instruction signal is a signal for instructing the destination wireless communication terminal 31 (here, the second wireless communication terminal 31-2) to perform SL communication with the target terminal (here, the first wireless communication terminal 31-1). Specifically, the SLReq instruction signal is a signal for making the destination wireless communication terminal 31 transmit an SLReq signal to start SL communication with the target terminal. The SLReq instruction signal includes the identification information of the first wireless communication terminal 31-1 as information for specifying the target terminal. The SLReq instruction signal may include the identification information of the second wireless communication terminal 31-2 as the information to specify the relay terminal.

Note that, the control system 2 may transmit the SLReq instruction signal for the second wireless communication terminal 31-2 to the second wireless communication terminal 31-2 (relay terminal) and the first wireless communication terminal 31-1 (target terminal) by, for example, multicast. That is, the destination of the SLReq instruction signal may be set as the second wireless communication terminal 31-2 and the first wireless communication terminal 31-1. When the received SLReq instruction signal includes the identification information of the first wireless communication terminal 31-1 as the information to specify the target terminal, the first wireless communication terminal 31-1 can recognize that the terminal 31-1 is the target terminal of relay communication (specifically, SL communication). In this case, the first wireless communication terminal 31-1 executes a process of waiting for reception of a signal through the SL communication (S210). Thus, the first wireless communication terminal 31-1 efficiently receives signals through the SL communication.

In response to receiving the SLReq instruction signal whose destination is the second wireless communication terminal 31-2 from the control system 2, the second wireless communication terminal 31-2 transmits an SLReq signal to the control system 2 through PUCCH (S211). For example, when the received SLReq instruction signal includes the identification information of the first wireless communication terminal 31-1 as the information to specify the target terminal, the second wireless communication terminal 31-2 can recognize that the terminal 31-2 is not the target terminal of the relay communication but the relay terminal. Alternatively, the second wireless communication terminal 31-2 can recognize that the terminal 31-2 is the relay terminal when, for example, the received SLReq instruction signal includes the identification information of the second wireless communication terminal 31-2 as information to specify the relay terminal.

In response to receiving the SLReq signal from the second wireless communication terminal 31-2, the control system 2 allocates resources for SL communication between the first wireless communication terminal 31-1 and the second wireless communication terminal 31-2, and transmits a signal including downlink control information (DCI5) to the second wireless communication terminal 31-2 through PDCCH (S212). Then, the control system 2 transmits an operation signal for the first wireless communication terminal 31-1 to the second wireless communication terminal 31-2 through PDSCH (S213). This operation signal is a signal to operate at least a part of the first wireless communication terminal 31-1.

The second wireless communication terminal 31-2 receives the signal including the downlink control information and the operation signal for the first wireless communication terminal 31-1. The second wireless communication terminal 31-2 performs SL communication with the first wireless communication terminal 31-1 according to the time and frequency band indicated in the downlink control information.

Specifically, first, the second wireless communication terminal 31-2 transmits a signal containing information related to the wireless settings and the allocated resources for the SL communication to the first wireless communication terminal 31-1 through PSCCH (S214). Next, the second wireless communication terminal 31-2 transmits (transfers) the operation signal for the first wireless communication terminal 31-1 to the first wireless communication terminal 31-1 through PSSCH (S215).

The first wireless communication terminal 31-1 transmits a response signal to the second wireless communication terminal 31-2 through PSFCH in response to receiving the operation signal through PSSCH (S216). The first wireless communication terminal 31-1 operates at least a part of the first wireless communication terminal 31-1 according to the received operation signal. Then, the first wireless communication terminal 31-1 transmits a data signal through PSCCH to the second wireless communication terminal 31-2 (S217).

The second wireless communication terminal 31-2 receives the response signal and the data signal transmitted by the first wireless communication terminal 31-1. The second wireless communication terminal 31-2 transmits a response signal to the first wireless communication terminal 31-1 through PSFCH in response to the receiving of the data signal (S218). The second wireless communication terminal 31-2 may transmit (transfer) the data signal received from the first wireless communication terminal 31-1 to the control system 2 through PUSCH.

Note that, when the communication state of the direct communication (wireless link 25) between the control system 2 and the first wireless communication terminal 31-1 is improved, the control system 2 can receive the response signal of S216 and the data signal of S217 from the first wireless communication terminal 31-1. Furthermore, since the control system 2 transmits the SLReq instruction signal in S209 and receives the SLReq signal in S211, the control system 2 can estimate a time when a signal is transmitted and received in the SL communication between the second wireless communication terminal 31-2 and the first wireless communication terminal 31-1. The control system 2 waits for reception of the response signal and the data signal from the first wireless communication terminal 31-1 to the second wireless communication terminal 31-2 during the period when the signals are expected to be transmitted. The control system 2 determines, for example, whether to switch the communication between the control system 2 and the first wireless communication terminal 31-1 from relay communication to direct communication in accordance with at least one of the response signal or the data signal from the first wireless communication terminal 31-1 to the second wireless communication terminal 31-2 (S219). For example, when the control system 2 receives at least one of the response signal or the data signal, the control system 2 determines to switch the communication with the first wireless communication terminal 31-1 to direct communication. The control system 2 may determine that the communication with the first wireless communication terminal 31-1 is switched to direct communication when the number of times the response signal or the data signal is received exceeds a threshold. Furthermore, the control system 2 may determine to switch the communication with the first wireless communication terminal 31-1 to direct communication when a sum of the number of times the response signal is received and the number of times the data signal is received exceeds a threshold.

On the other hand, for example, when neither the response signal nor the data signal is received, the control system 2 determines to maintain the relay communication as the communication with the first wireless communication terminal 31-1. When only one of the response signal and the data signal is received, the control system 2 may determine to maintain the relay communication as the communication with the first wireless communication terminal 31-1. When the number of times the response signal or the data signal is received is less than a threshold, the control system 2 may determine to maintain the relay communication as the communication with the first wireless communication terminal 31-1. When the sum of the number of times the response signal is received and the number of times the data signal is received is less than a threshold, the control system 2 may determine to maintain the relay communication as the communication with the first wireless communication terminal 31-1.

In a case where the communication between the control system 2 and the wireless communication terminal 31-1 is switched to direct communication, the processing sequence in the wireless communication system 1 returns to S201, for example. Thus, the control system 2 can transmit a new operation signal for the first wireless communication terminal 31-1 through the direct communication. Therefore, the first wireless communication terminal 31-1 receives the new operation signal for the first wireless communication terminal 31-1 from the control system 2.

In a case where the relay communication is maintained as the communication between the control system 2 and the wireless communication terminal 31-1, the processing sequence in the wireless communication system 1 returns to S212, for example. As a result, the control system 2 can transmit a new operation signal to the wireless communication terminal 31-1 through the relay communication via the second wireless communication terminal 31-2. That is, the control system 2 transmits the new operation signal for the first wireless communication terminal 31-1 to the second wireless communication terminal 31-2. The second wireless communication terminal 31-2 receives the operation signal and transmits it to the first wireless communication terminal 31-1. Therefore, the first wireless communication terminal 31-1 receives the new operation signal for the first wireless communication terminal 31-1 from the second wireless communication terminal 31-2.

As above, the terminal-to-terminal communication between the first wireless communication terminal 31-1 and the second wireless communication terminal 31-2 that may be started by an SLReq instruction signal is defined as including transmitting an operation signal for operating at least a part of the first wireless communication terminal 31-1 from the second wireless communication terminal 31-2 to the first wireless communication terminal 31-1. The operation signal is transmitted to the second wireless communication terminal 31-2 from the server 21 via the base station 22. The operation signal may include the operation signal transmitted in S213 and S215 and an operation signal that is subsequently transmitted.

Note that the control system 2 may perform transmission of an operation signal to the first wireless communication terminal 31-1 through relay communication in parallel with transmission of an operation signal to the second wireless communication terminal 31-2 through direct communication. The second wireless communication terminal 31-2 may receive the operation signal for the first wireless communication terminal 31-1 through relay communication and the operation signal for the second wireless communication terminal 31-2 through direct communication in parallel (e.g. alternately). The order in which the control system 2 transmits an operation signal for the first wireless communication terminal 31-1 and an operation signal for the second wireless communication terminal 31-2 after the relay communication is started (e.g., after the second wireless communication terminal 31-2 transmits an SLReq signal) may be predetermined. In such a case, the second wireless communication terminal 31-2 can determine whether a received operation signal is an operation signal for the first wireless communication terminal 31-1 or an operation signal for the second wireless communication terminal 31-2 on the basis of the order in which they are received. Alternatively, an operation signal may contain information to identify a wireless communication terminal 31 to be operated by the operation signal.

With the above processing sequence in FIG. 7, the control system 2 transmits an operation signal to the first wireless communication terminal 31-1 through relay communication via the second wireless communication terminal 31-2 even when the communication state of direct communication with the first wireless communication terminal 31-1 deteriorates. Therefore, the control system 2 can stably operate movement of the first wireless communication terminal 31-1.

In the processing sequence in FIG. 7, the example in which the first wireless communication terminal 31-1 is a target terminal of relay communication is illustrated, but other wireless communication terminals 31 may be a target terminal of relay communication as well. Furthermore, there may be a case where the first wireless communication terminal 31-1 is a relay terminal of relay communication.

Note that the control system 2 may switch the communication with the first wireless communication terminal 31-1 from relay communication to direct communication by predicting a time when the communication state of the direct communication with the first wireless communication terminal 31-1 will be improved.

Figure 8:
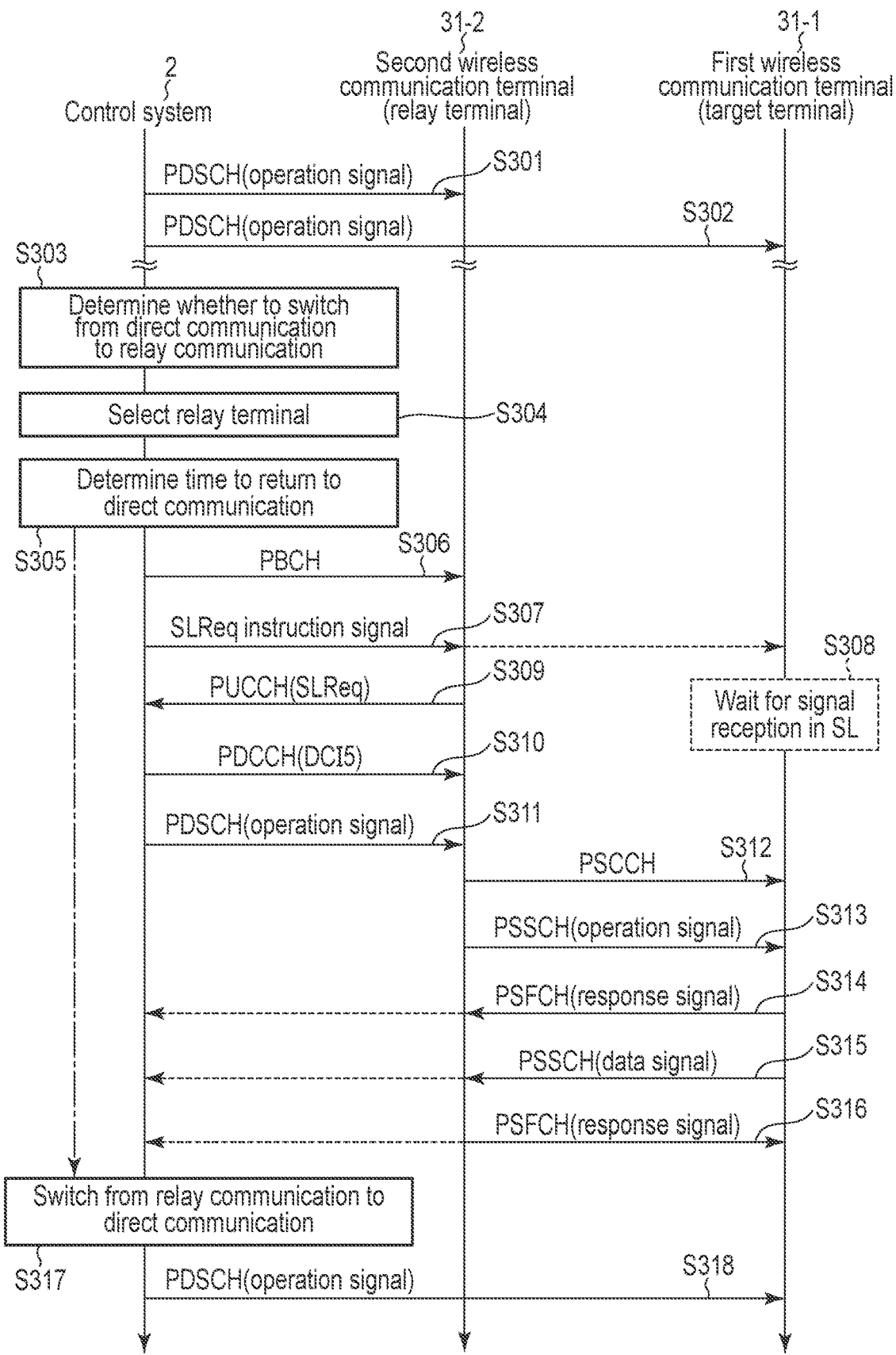
FIG. 8 is a diagram illustrating a second example of the processing sequence in the wireless communication system of FIG. 1.

FIG. 8 illustrates a second example of the processing sequence in the wireless communication system 1. In this processing sequence, a process to determine a time to switch the communication with the first wireless communication terminal 31-1 from relay communication to direct communication, and to switch the communication with the first wireless communication terminal 31-1 from relay communication to direct communication at the determined time is added to the processing sequence of FIG. 7.

The processes from S301 to S304 of the processing sequence in FIG. 8 are the same as those from S201 to S207 of the processing sequence in FIG. 7. In FIG. 8, the illustrations of the processes from S203 to S205 are omitted.

After selecting the second wireless communication terminal 31-2 as a relay terminal in S304, the control system 2 determines a time to switch the communication with the first wireless communication terminal 31-1 from relay communication to direct communication (hereinafter referred to as a switching time) (S305). The control system 2 estimates a switching time at which the communication state of direct communication with the first wireless communication terminal 31-1 is improved by using, for example, the radio map 45 and information related to movement of the first wireless communication terminal 31-1. The information related to movement of the first wireless communication terminal 31-1 includes, for example, information indicating at least one of the position, speed, or movement direction of the first wireless communication terminal 31-1. The control system 2 determines, for example, a time at which the first wireless communication terminal 31-1 moves to a position in an area on the radio map 45 where the error rate is less than a threshold as the switching time.

The switching time may be expressed by any value as long as the control system 2 can recognize the time to switch the communication with the first wireless communication terminal 31-1 from relay communication to direct communication. The switching time may be expressed by, for example, a time, a time elapsed since an SLReq signal was received in S309, or a time elapsed since an operation signal was transmitted in S311.

The subsequent processing from S306 to S316 is the same as the processing from S208 to S218 of the processing sequence in FIG. 7. That is, the processing for transmitting an operation signal for the first wireless communication terminal 31-1 from the control system 2 to the first wireless communication terminal 31-1 via the second wireless communication terminal 31-2 and the processing for responding to the operation signal are performed.

Next, the control system 2 determines whether or not the current time has reached the switching time determined in S305. When the current time has reached the switching time, the control system 2 switches the communication with the first wireless communication terminal 31-1 from relay communication to direct communication (S317). Then, the control system 2 transmits a new operation signal for the first wireless communication terminal 31-1 to the first wireless communication terminal 31-1 through direct communication (S318). That is, when the first wireless communication terminal 31-1 moves to a position within an area on the radio map 45 where the error rate is less than the threshold, the control system 2 transmits the new operation signal for the first wireless communication terminal 31-1 to the first wireless communication terminal 31-1. Thus, the first wireless communication terminal 31-1 receives the new operation signal for the first wireless communication terminal 31-1 from the control system 2.

With the above processing sequence of FIG. 8, the control system 2 can return the communication with the first wireless communication terminal 31-1 from relay communication to direct communication by using the radio map 45 and the information related to movement of the first wireless communication terminal 31-1. That is, the control system 2 can change the communication with the first wireless communication terminal 31-1 from relay communication to direct communication without using a response signal and a data signal that respond to the operation signal and are transmitted from the first wireless communication terminal 31-1.

Next, an example where the control system 2 uses multiple wireless communication terminals 31 as candidates for a relay terminal will be explained.

Figure 9:
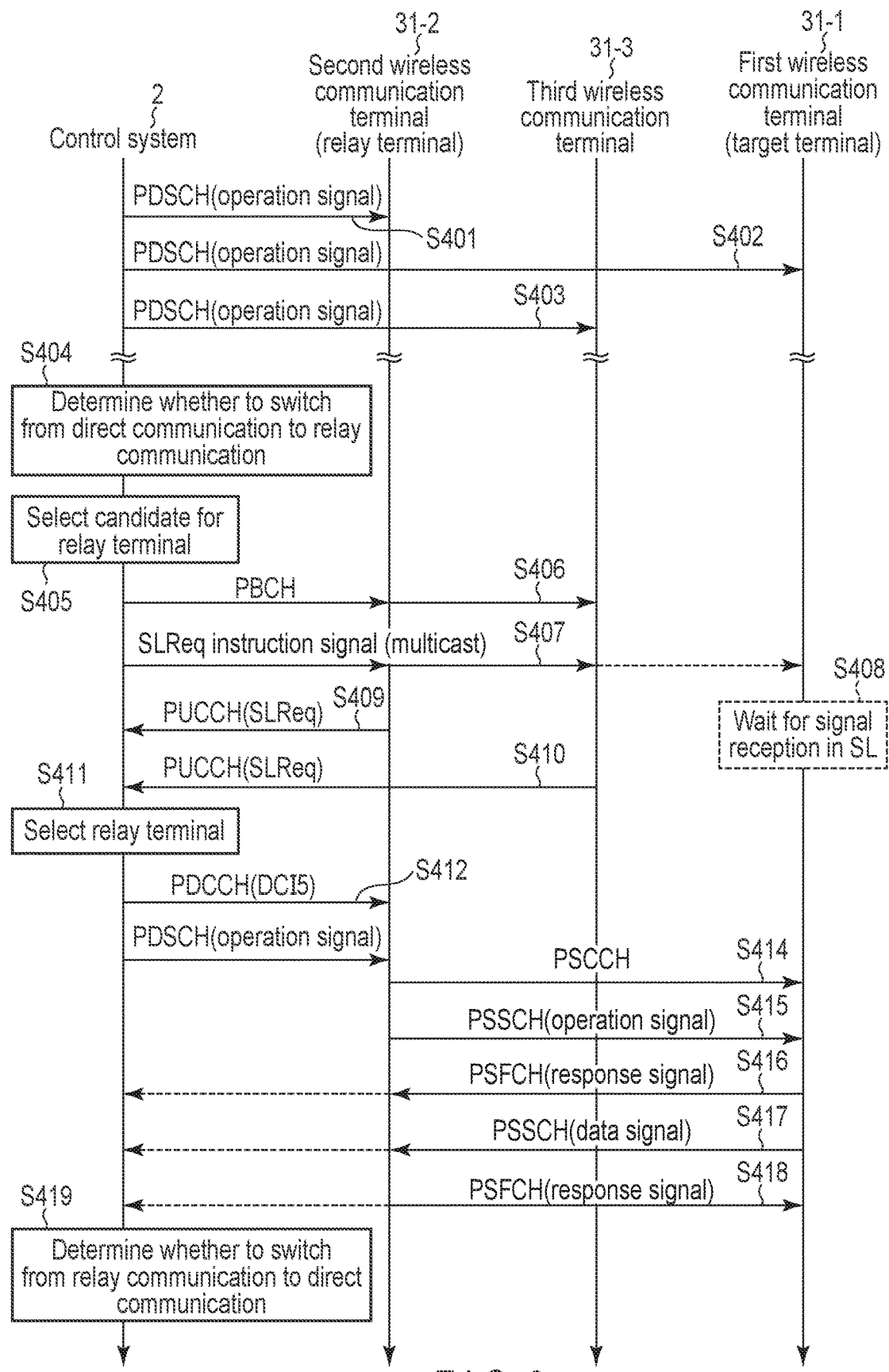
FIG. 9 is a diagram illustrating a third example of the processing sequence in the wireless communication system of FIG. 1.

FIG. 9 illustrates a third example of the processing sequence in the wireless communication system 1. In this processing sequence, a process for selecting one from candidates for a relay terminal is added to the processing sequence of FIG. 7. Here, a case where the second wireless communication terminal 31-2 and the third wireless communication terminal 31-3 are selected as the candidates for the relay terminal will be illustrated. Note that, the number of wireless communication terminals 31 selected as the candidates for the relay terminal is freely determined.

First, the control system 2 transmits an operation signal for the second wireless communication terminal 31-2 to the second wireless communication terminal 31-2 through PDSCH (S401). The control system 2 transmits an operation signal for the first wireless communication terminal 31-1 to the first wireless communication terminal 31-1 through PDSCH (S402). The control system 2 transmits an operation signal for the third wireless communication terminal 31-3 to the third wireless communication terminal 31-3 through PDSCH (S403). The operation signal for the third wireless communication terminal 31-3 is a signal for operating at least a part of the third wireless communication terminal 31-3 (e.g., a signal for moving the third wireless communication terminal 31-3).

Although not illustrated in FIG. 9, each of the wireless communication terminals 31-1, 31-2, and 31-3 may transmit a response signal and a data signal in response to the operation signal to the control system 2 through PUSCH. The control system 2 may transmit a response signal to the data signal to each of the wireless communication terminals 31-1, 31-2, and 31-3 through PDSCH.

Next, the control system 2 determines whether to switch the communication with the first wireless communication terminal 31-1 from direct communication to relay communication (S404). In the following example, a case where the control system 2 determines to switch the communication with the first wireless communication terminal 31-1 to relay communication will be illustrated.

The control system 2 selects candidates for a relay terminal that relays the communication between the control system 2 and the first wireless communication terminal 31-1 (S405). The candidates for the relay terminal include a wireless communication terminal 31 that has a good communication state through direct communication with the control system 2 and is capable of performing SL communication with the first wireless communication terminal 31-1. The control system 2 uses the radio map 45 and information related to movement of each wireless communication terminal 31 to select the candidates for the relay terminal that relays the communication between the control system 2 and the first wireless communication terminal 31-1. The information related to movement of each wireless communication terminal 31 includes, for example, information indicating at least one of the position, speed, or movement direction of the wireless communication terminal 31. The control system 2 selects, for example, a wireless communication terminal 31 as a candidate for the relay terminal when the wireless communication terminal 31 is located in an area on the radio map 45 where the communication state with the control system 2 is good and the distance between the wireless communication terminal 31 and the first wireless communication terminal 31-1 is less than a threshold. The area where the communication state with the control system 2 is good is, for example, an area on the radio map 45 where the error rate is less than a threshold.

The control system 2 may select the candidates for the relay terminal by using an image acquired by the image capture unit 55 of each wireless communication terminal 31. Specifically, the image capture unit 55 of each wireless communication terminal 31 generates an image of the surroundings of the corresponding wireless communication terminal 31. Each wireless communication terminal 31 transmits the generated image to the control system 2. The control system 2 processes the image received from each wireless communication terminal 31 to determine whether the image includes the first wireless communication terminal 31-1. The control system 2 selects the wireless communication terminal 31 that acquired the image including the first wireless communication terminal 31-1 as a candidate for the relay terminal.

In the following, a case where the control system 2 selects the second wireless communication terminal 31-2 and the third wireless communication terminal 31-3 as the candidates for the relay terminal will be illustrated.

The control system 2 transmits a signal including information related to SL communication to the selected second wireless communication terminal 31-2 and third wireless communication terminal 31-3 through PBCH (S406). Then, the control system 2 transmits an SLReq instruction signal to the second wireless communication terminal 31-2 and the third wireless communication terminal 31-3 by, for example, multicast through PDSCH (S407). That is, the SLReq instruction signal whose destination is the second wireless communication terminal 31-2 and the third wireless communication terminal 31-3 is transmitted. The SLReq instruction signal is a signal to instruct the second wireless communication terminal 31-2 and the third wireless communication terminal 31-3 to perform SL communication with the first wireless communication terminal 31-1. Specifically, the SLReq instruction signal is a signal to make each of the second and third wireless communication terminals 31-2 and 31-3 transmit an SLReq signal for starting SL communication with the first wireless communication terminal 31-1. The SLReq instruction signal includes the identification information of the first wireless communication terminal 31-1 as information to specify a target terminal. The SLReq instruction signal may include the identification information of the second wireless communication terminal 31-2 and the identification information of the third wireless communication terminal 31-3 as information to specify candidates for a relay terminal.

Note that the control system 2 may transmit the SLReq instruction signal to the second wireless communication terminal 31-2 and the third wireless communication terminal 31-3 (candidates for the relay terminal) and the first wireless communication terminal 31-1 (target terminal), for example, by multicast. When the received SLReq instruction signal includes the identification information of the first wireless communication terminal 31-1 as information to specify a target terminal, the first wireless communication terminal 31-1 can recognize that the terminal 31-1 is a target terminal of relay communication. In such a case, the first wireless communication terminal 31-1 may execute a process to wait for reception of a signal in SL communication (S408). Thus, the first wireless communication terminal 31-1 can efficiently receive signals in the SL communication.

When receiving the SLReq instruction signal whose destination is the second wireless communication terminal 31-2 from the control system 2, the second wireless communication terminal 31-2 transmits an SLReq signal to the control system 2 through PUCCH (S409). Furthermore, when receiving the SLReq instruction signal whose destination is the third wireless communication terminal 31-3 from the control system 2, the third wireless communication terminal 31-3 transmits an SLReq signal to the control system 2 through PUCCH (S410).

The control system 2 selects a relay terminal according to the fact that the SLReq signals have been received from the second wireless communication terminal 31-2 and the third wireless communication terminal 31-3, respectively (S411). The control system 2 selects one of the second wireless communication terminal 31-2 and the third wireless communication terminal 31-3 as the relay terminal. The selected one has better communication state of the direct communication with the control system 2 and better communication state of the SL communication with the first wireless communication terminal 31-1. The selection of the relay terminal is made in the same manner as the process of selecting the candidates for the relay terminal in S405, by using the radio map 45, information related to movement of each of the wireless communication terminals 31-1, 31-2, and 31-3, and an image captured by the image capture unit 55 of each of the wireless communication terminals 31-1, 31-2, and 31-3. For example, the control system 2 selects the one which is closer to the first wireless communication terminal 31-1 or the one which acquired an image in which the first wireless communication terminal 31-1 is included larger from the second wireless communication terminal 31-2 and the third wireless communication terminal 31-3 as the relay terminal. Furthermore, in a case where the control system 2 receives an SLReq signal from the second wireless communication terminal 31-2 and does not receive an SLReq signal from the third wireless communication terminal 31-3 within a specific period of time since the SLReq instruction signal was transmitted, the control system 2 may select the second wireless communication terminal 31-2 as the relay terminal. Furthermore, the control system 2 may select the wireless communication terminal 31 that is the sender of the SLReq signal received earlier, as the relay terminal.

In the following, a case where the control system 2 selects the second wireless communication terminal 31-2 as the relay terminal will be illustrated.

The subsequent processing from S412 to S419 is the same as the processing from S212 to S219 in the processing sequence of FIG. 7. That is, the processing for transmitting an operation signal for the first wireless communication terminal 31-1 from the control system 2 to the first wireless communication terminal 31-1 via the second wireless communication terminal 31-2, and the processing for determining whether to switch the communication with the first wireless communication terminal 31-1 from relay communication to direct communication by using a response signal and a data signal to the operation signal are performed.

With the above processing sequence of FIG. 9, the control system 2 can multicast an SLReq instruction signal to multiple candidates for a relay terminal, and perform relay communication with the first wireless communication terminal 31 by using one of the candidates as a relay terminal. By multicasting the SLReq instruction signal to the candidates of the relay terminal, the possibility of performing relay communication between the control system 2 and the first wireless communication terminal 31-1 can be increased.

Second Embodiment

In the first embodiment, the control system 2 transmits an SLReq instruction signal to a relay terminal that relays communication between the control system 2 and a target terminal or to one or more wireless communication terminals 31 selected as candidates for the relay terminal. In contrast, in a second embodiment, the control system 2 transmits an SLReq instruction signal by broadcast. That is, the control system 2 transmits the SLReq instruction signal without limiting a wireless communication terminal 31 to be the destination.

The configuration of the wireless communication system 1 according to the second embodiment is the same as that of the wireless communication system 1 of the first embodiment. The second embodiment is different from the first embodiment only in terms of processing for broadcasting an SLReq instruction signal from a control system 2 and processing according to the broadcasted SLReq instruction signal. Hereinafter, the difference from the first embodiment will be mainly described.

Figure 10:
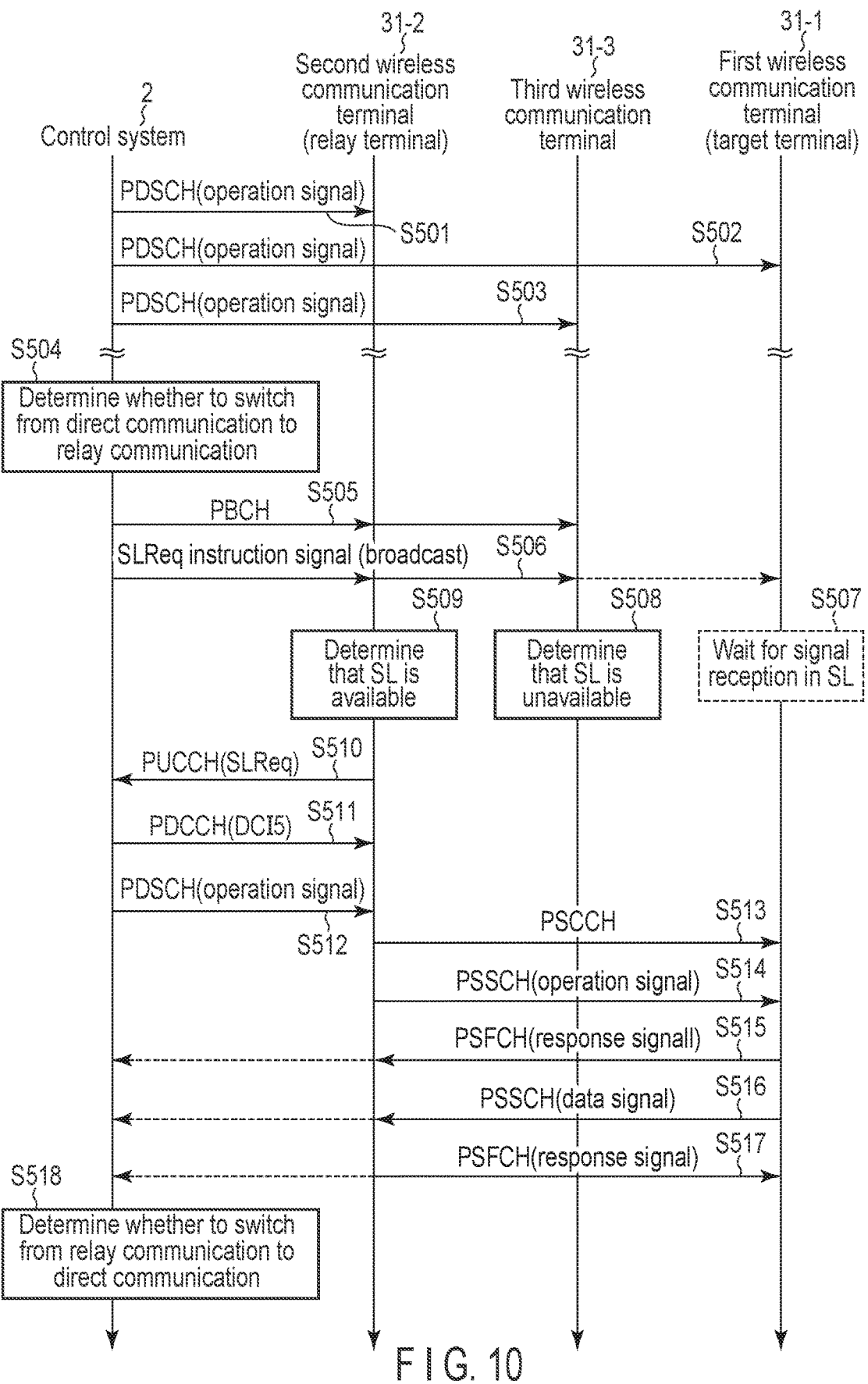
FIG. 10 is a diagram illustrating an example of a processing sequence in a wireless communication system according to a second embodiment.

FIG. 10 illustrates an example of a processing sequence performed in the wireless communication system 1 of the second embodiment. In this processing sequence, the control system 2 transmits an SLReq instruction signal by broadcast. Therefore, the control system 2 has not selected a relay terminal or candidates for the relay terminal before transmitting the SLReq instruction signal.

The process from S501 to S505 of the processing sequence of FIG. 10 is the same as the process from S401 to S404 and S406 of the processing sequence of FIG. 9.

Next, the control system 2 transmits an SLReq instruction signal by broadcast (S506). The broadcasted SLReq instruction signal is received by a wireless communication terminal 31 which can directly communicate with the control system 2. The SLReq instruction signal includes the identification information of the first wireless communication terminal 31-1 as information to specify the target terminal. Note that the control system 2 may transmit the SLReq instruction signal to several wireless communication terminals 31 by multicast.

The first wireless communication terminal 31-1 receives the SLReq instruction signal, and can recognize that the terminal 31-1 is the target terminal of relay communication (SL communication) when the SLReq instruction signal includes the identification information of the first wireless communication terminal 31-1 as information to specify the target terminal. In that case, the first wireless communication terminal 31-1 may execute a process to wait for reception of a signal in SL communication (S507).

the second wireless communication terminal 31-2 and the third wireless communication terminal 31-3 receive the SLReq instruction signal, and determine whether or not SL communication with the first wireless communication terminal 31-1 is possible when the SLReq instruction signal includes the identification information of the first wireless communication terminal 31-1 as the information to specify the target terminal. Each of the second and third wireless communication terminals 31-2 and 31-3 transmits an SLReq signal to the control system 2 when SL communication with the first wireless communication terminal 31-1 is possible. On the other hand, each of the second and third wireless communication terminals 31-2 and 31-3 does not transmit an SLReq signal to the control system 2 when SL communication with the first wireless communication terminal 31-1 is not possible. That is, when having received the SLReq instruction signal, each of the second and third wireless communication terminals 31-2 and 31-3 determines whether to transmit an SLReq signal to the control system 2 in order to perform SL communication with the first wireless communication terminal 31-1. For example, the following methods (1) to (3) are used to determine whether or not SL communication with the first wireless communication terminal 31-1 is possible.

(1) Using Information Related to Movement of Wireless Communication Terminal 31

The second wireless communication terminal 31-2 receives information related to movement of the second wireless communication terminal 31-2 from the control system 2. The second wireless communication terminal 31-2 may acquire the information related to movement of the second wireless communication terminal 31-2 by sensing. The second wireless communication terminal 31-2 acquires information related to movement of the first wireless communication terminal 31-1 that is included in, for example, the SLReq instruction signal. Information related to movement may include various information related to movement, such as the position, speed, and movement direction of the corresponding wireless communication terminal 31. The second wireless communication terminal 31-2 determines whether or not SL communication with the first wireless communication terminal 31-1 is possible by using the information related to movement of the second wireless communication terminal 31-2 and the information related to movement of the first wireless communication terminal 31-1.

Specifically, the second wireless communication terminal 31-2 calculates, for example, the distance between the second wireless communication terminal 31-2 and the first wireless communication terminal 31-1 on the basis of the position of the second wireless communication terminal 31-2 and the position of the first wireless communication terminal 31-1. When the calculated distance is less than a threshold, the second wireless communication terminal 31-2 determines that SL communication with the first wireless communication terminal 31-1 is possible. On the other hand, when the calculated distance is equal to or greater than the threshold, the second wireless communication terminal 31-2 determines that SL communication with the first wireless communication terminal 31-1 is impossible.

Note that, the second wireless communication terminal 31-2 may determine whether or not SL communication with the first wireless communication terminal 31-1 is possible in further consideration of the movement direction of the second wireless communication terminal 31-2 and the movement direction of the first wireless communication terminal 31-1. For example, when the distance between the second wireless communication terminal 31-2 and the first wireless communication is less than a threshold, and the distance is maintained or becomes closer according to the direction of movement of the second wireless communication terminal 31-2 and the direction of movement of the first wireless communication terminal 31-1, the second wireless communication terminal 31-2 may determine that SL communication with the first wireless communication terminal 31-1 is possible. In contrast, when the distance between the second wireless communication terminal 31-2 and the first wireless communication is less than the threshold, but the distance become distant according to the direction of movement of the second wireless communication terminal 31-2 and the direction of movement of the first wireless communication terminal 31-1, the second wireless communication terminal 31-2 determines that SL communication with the first wireless communication terminal 31-1 is impossible.

The third wireless communication terminal 31-3 also receives information related to movement of the third wireless communication terminal 31-3 from the control system 2. The third wireless communication terminal 31-3 may acquire the information related to movement of the third wireless communication terminal 31-3 by sensing. Furthermore, the third wireless communication terminal 31-3 acquires information related to movement of the first wireless communication terminal 31-1 that is included in, for example, the SLReq instruction signal. The third wireless communication terminal 31-3 uses the information related to movement of the third wireless communication terminal 31-3 and the information related to movement of the first wireless communication terminal 31-1 to determine whether or not SL communication with the first wireless communication terminal 31-1 is possible. The specific determination method using the information related to movement is the same as the method described above with respect to the second wireless communication terminal 31-2.

(2) Using Signal Heard by Wireless Communication Terminal 31

Each wireless communication terminal 31 always hears (receives) signals transmitted and received by other wireless communication terminals 31. Each wireless communication terminal 31 retains the identification information (e.g., signal address) indicating the sender of the heard signal for a certain period of time. A wireless communication terminal 31 determines that it is able to communicate with a wireless communication terminal 31 corresponding to the identification information for the certain period of time during which the identification information is retained.

Specifically, when the identification information of the first wireless communication terminal 31-1 indicated in the SLReq instruction signal matches one of the pieces of identification information retained by the second wireless communication terminal 31-2, the second wireless communication terminal 31-2 determines that SL communication with the first wireless communication terminal 31-1 is possible. On the other hand, when the identification information of the first wireless communication terminal 31-1 indicated in the SLReq instruction signal does not match any of the pieces of identification information that are retained, the second wireless communication terminal 31-2 determines that SL communication with the first wireless communication terminal 31-1 is impossible.

Similarly, when the identification information of the first wireless communication terminal 31-1 indicated in the SLReq instruction signal matches one of pieces of identification information that are retained by the third wireless communication terminal 31-3, the third wireless communication terminal 31-3 determines that SL communication with the first wireless communication terminal 31-1 is possible. On the other hand, when the identification information of the first wireless communication terminal 31-1 indicated in the SLReq instruction signal does not match any of the pieces of identification information, the third wireless communication terminal 31-3 determines that SL communication with the first wireless communication terminal 31-1 is impossible.

(3) Using Image Acquired by Image Capture Unit 55 of Wireless Communication Terminal 31

Each wireless communication terminal 31 that includes an image capture unit 55 determines whether or not SL communication with the target terminal is possible by using an image captured by the image capture unit 55. The image capture unit 55 generates an image of the surroundings of the wireless communication terminal 31. The wireless communication terminal 31 processes the image generated by the image capture unit 55 to determine whether or not the image includes the target terminal (in this case, the first wireless communication terminal 31-1). That is, the wireless communication terminal 31 determines that SL communication with the target terminal 31 is possible when the target terminal 31 is included in the image generated by the image capture unit 55. On the other hand, when the target terminal 31 is not included in the image generated by the image capture unit 55, the wireless communication terminal 31 determines that SL communication with the target terminal 31 is impossible.

In the example illustrated in FIG. 10, the third wireless communication terminal 31-3 determines that SL communication with the first wireless communication terminal 31-1 is impossible (S508). Since the SL communication with the first wireless communication terminal 31-1 is impossible, the third wireless communication terminal 31-3 does not transmit an SLReq signal to the control system 2.

In contrast, the second wireless communication terminal 31-2 determines that SL communication with the first wireless communication terminal 31-1 is possible (S509). Since the SL communication with the first wireless communication terminal 31-1 is possible, the second wireless communication terminal 31-2 transmits an SLReq signal to the control system 2 (S510).

The subsequent processing from S511 to S518 is the same as the processing from S212 to S219 in the processing sequence of FIG. 7. That is, processing for transmitting an operation signal for the first wireless communication terminal 31-1 from the control system 2 to the first wireless communication terminal 31-1 via the second wireless communication terminal 31-2, and processing for determining whether to switch the communication with the first wireless communication terminal 31-1 from relay communication to direct communication by using a response to the operation signal are performed.

According to the above processing sequence of FIG. 10, the control system 2 broadcasts an SLReq instruction signal. Among the wireless communication terminals 31 that receive the broadcasted SLReq instruction signal, the wireless communication terminal 31 that is capable of SL communication with the target terminal 31 indicated by the SLReq instruction signal transmits an SLReq signal to the control system 2. That is, the wireless communication terminal 31 that receives the SLReq instruction signal determines whether or not SL communication with the target terminal is possible. Therefore, the control system 2 can broadcast the SLReq instruction signal without performing the process of selecting a relay terminal or candidates for the relay terminal, and then determine the relay terminal.

In response to broadcasting an SLReq instruction signal, the control system 2 may receive SLReq signals from multiple wireless communication terminals 31.

FIG. 11 illustrates another example of the processing sequence performed in the wireless communication system 1. In this processing sequence, the control system 2 transmits an SLReq instruction signal by broadcast, and then receives SLReq signals from multiple wireless communication terminals 31, respectively.

The process from S601 to S607 in the processing sequence of FIG. 11 is the same as the process from S501 to S507 in the processing sequence of FIG. 10.

The second wireless communication terminal 31-2 which has received the SLReq instruction signal determines that SL communication with the first wireless communication terminal 31-1 is possible (S608). Since the SL communication with the first wireless communication terminal 31-1 is possible, the second wireless communication terminal 31-2 transmits an SLReq signal to the control system 2 (S609).

The third wireless communication terminal 31-3 which has received the SLReq instruction signal determines that SL communication with the first wireless communication terminal 31-1 is possible (S610). Since the SL communication with the first wireless communication terminal 31-1 is possible, the third wireless communication terminal 31-3 transmits an SLReq signal to the control system 2 (S611).

When the control system 2 receives the SLReq signals from the wireless communication terminals 31-2 and 31-3, the control system 2 selects one of the wireless communication terminals 31-2 and 31-3 as a relay terminal (S612). The method of selecting one of the wireless communication terminals 31-2 and 31-3 as a relay terminal is as described above in S411 of the processing sequence in FIG. 9.

According to the processing sequence of FIG. 11 above, when multiple wireless communication terminals 31 capable of SL communication with the target terminal 31 each transmit an SLReq signal in response to an SLReq instruction signal broadcasted by the control system 2, the control system 2 can select a wireless communication terminal 31 suitable for the relay communication between the control system 2 and the target terminal 31 from the wireless communication terminals 31. Therefore, the control system 2 can determine a relay terminal 31 that can perform good relay communication by broadcasting the SLReq instruction signal.

Third Embodiment

In the first and second embodiments, after a relay terminal 31 is selected (determined), an operation signal for a target terminal 31 is transmitted from the control system 2 to the target terminal 31 via the relay terminal 31. A third embodiment further controls a time at which an operation signal reaches the target terminal 31.

The configuration of a wireless communication system 1 according to the third embodiment is the same as those of the wireless communication systems 1 of the first and second embodiments. The third embodiment is different from the first and second embodiments only in terms of processing for controlling a time at which an operation signal reaches the target terminal. Hereinafter, the difference from the first and second embodiments will be mainly described.

Figure 12:
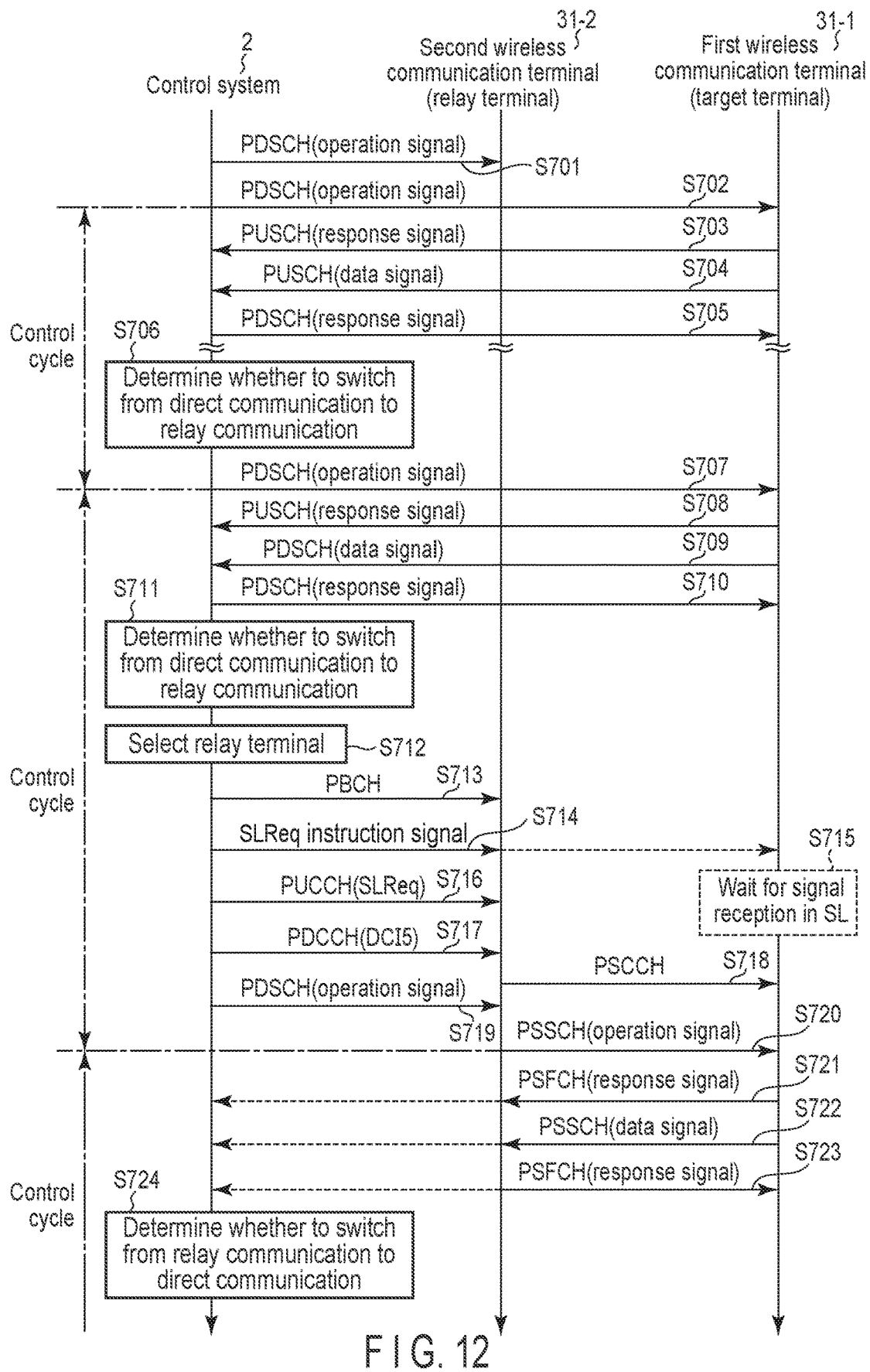
FIG. 12 is a diagram illustrating an example of a processing sequence in a wireless communication system according to a third embodiment.

FIG. 12 illustrates an example of a processing sequence performed in the wireless communication system 1 of the third embodiment. The control system 2 controls a time to transmit (transfer) an operation signal for a wireless communication terminal 31 such that the operation signal for the wireless communication terminal 31 reaches the wireless communication terminal 31 at every specific control cycle. The specific control cycle may be the same value for multiple wireless communication terminals 31, or it may be different for each of them. The specific control cycle may be constant or may vary depending on the position and movement speed of the wireless communication terminal 31.

Hereinafter, a case where the specific control cycle is constant will be described in order to facilitate understanding of the description. In the processing sequence of FIG. 12, an operation signal for the wireless communication terminal 31 (target terminal 31) reaches the wireless communication terminal 31 in the specific control cycle. During one cycle, the control system 2 determines whether to use direct communication or relay communication for communication with the wireless communication terminal 31 by using the state of transmission and reception of the last signal with the wireless communication terminal 31 and information related to movement of the wireless communication terminal 31.

The process from S701 to S706 of the processing sequence of FIG. 12 is the same as the process from S201 to S206 of the processing sequence of FIG. 7.

When it is determined in S706 that direct communication is maintained as the communication with the first wireless communication terminal 31-1, the control system 2 transmits a new operation signal for the first wireless communication terminal 31-1 through PDSCH according to the control cycle (S707). The period between the time when the operation signal reaches the first wireless communication terminal 31-1 in S702 and the time when the next operation signal reaches the first wireless communication terminal 31-1 in S707 corresponds to the control cycle. Note that the period between the time when the control system 2 transmits the operation signal to the first wireless communication terminal 31-1 in S702 and the time when the control system 2 transmits the operation signal to the first wireless communication terminal 31-1 in S707 may correspond to the control cycle. The control system 2 controls transmission of an operation signal such that the operation signal reaches the first wireless communication terminal 31-1 at every control cycle.

The subsequent processing from S708 to S716 is similar to the processing from S203 to S211 of the processing sequence of FIG. 7.

The control system 2 grasps a time when the second wireless communication terminal 31-2 (relay terminal) transmits a signal to the first wireless communication terminal 31-1 through SL communication. This is because, for example, the control system 2 transmits a signal specifying the time of transmission to the second wireless communication terminal 31-2. The signal specifying the time of transmission specifies, for example, a time at which the second wireless communication terminal 31-2 transmits a signal to the first wireless communication terminal 31-1 through SL communication between the second wireless communication terminal 31-2 and the first wireless communication terminal 31-1. The second wireless communication terminal 31-2 transmits, to the first wireless communication terminal 31-1, a signal that has been transmitted from the control system 2 to the second wireless communication terminal 31-2 and is to be relayed to the first wireless communication terminal 31-1 at the specified time of transmission. Therefore, the control system 2 can schedule a signal to be transmitted from the second wireless communication terminal 31-2 to the first wireless communication terminal 31-1 at a specific time of transmission.

Specifically, after receiving an SLReq signal from the second wireless communication terminal 31-2 in S716, the control system 2 transmits a signal containing downlink control information (DCI5) to the second wireless communication terminal 31-2 through PDCCH (S717).

The second wireless communication terminal 31-2 receives the signal containing downlink control information from the control system 2. The second wireless communication terminal 31-2 performs SL communication with the first wireless communication terminal 31-1 according to the time and frequency band indicated in the downlink control information. The second wireless communication terminal 31-2 transmits a signal including information related to wireless settings for the SL communication to the first wireless communication terminal 31-1 through PSCCH at the immediately following time of transmission occurring in the SL communication (S718).

Next, the control system 2 transmits an operation signal for the first wireless communication terminal 31-1 to the second wireless communication terminal 31-2 through PDSCH such that the operation signal reaches the first wireless communication terminal 31-2 at a time according to the control cycle (S719). That is, the control system 2 transmits the operation signal to the second wireless communication terminal 31-2 when the next time of transmission in the SL communication with the first wireless communication terminal 31-1 by the second wireless communication terminal 31-2 is a time corresponding to the control cycle.

The second wireless communication terminal 31-2 receives the operation signal from the control system 2, and transmits the received operation signal to the first wireless communication terminal 31-1 through PSCCH at the immediately following time of transmission occurring in the SL communication (S720). Thus, even when an operation signal is transmitted from the control system 2 to the first wireless communication terminal 31-1 through relay communication, the operation signal reaches the first wireless communication terminal 31-1 at a time corresponding to the control cycle.

Alternatively, the signal specifying the time of transmission may be a signal that specifies a period during which SL communication is performed between the second wireless communication terminal 31-2 and the first wireless communication terminal 31-1. In this case, the control system 2 notifies the second wireless communication terminal 31-2 of a time to transmit a signal to the first wireless communication terminal 31-1 within the specified period beforehand. The second wireless communication terminal 31-2 schedules a signal received from the control system 2 to be transmitted at the time of transmission.

When a period during which SL communication is to be performed is specified, a relay terminal that relays communication between the control system 2 and the first wireless communication terminal 31-1 may not be the second wireless communication terminal 31-2 but may be another type of wireless communication terminal such as a surveillance camera 32-1, 32-2, and 32-3. That is, a wireless communication terminal that is assumed to be responsible for scheduling a time of transmission in the SL communication (e.g., a wireless communication terminal dedicated for SL communication) may be used as a relay terminal.

The subsequent processing from S721 to S724 is similar to the processing from S216 to S219 of the processing sequence of FIG. 7.

With the processing sequence of FIG. 12, the control system 2 can schedule operation signals for the wireless communication terminal 31-1 to reach the first wireless communication terminal 31-1 at every control cycle, regardless of whether the communication between the control system 2 and the first wireless communication terminal 31-1 is performed through direct communication or relay communication. Thus, the first wireless communication terminal 31-1 receives an operation signal for the first wireless communication terminal 31-1 at every control cycle. Therefore, the control system 2 can stably operate the first wireless communication terminal 31-1 using the operation signal that reaches at every control cycle.

As explained above, according to the first to third embodiments, the wireless communication terminal 31 can be operated in a stable manner. The wireless transmitter 223 of the base station 22 transmits an SLReq instruction signal to the second wireless communication terminal 31-2 and one or more first operation signals to the second wireless communication terminal 31-2. The SLReq instruction signal instructs to transmit a signal that requests terminal-to-terminal communication between the first wireless communication terminal 31-1 and the second wireless communication terminal 31-2. The one or more first operation signals are used for operating at least a part of the first wireless communication terminal 31-1. The wireless receiver 224 is capable of receiving at least one of a response signal or a data signal transmitted from the first wireless communication terminal 31-1 to the second wireless communication terminal 31-2 after the first operation signal is transmitted. If the at least one of the response signal or the data signal is received, the wireless transmitter 223 transmits a second operation signal to either the first wireless communication terminal 31-1 or the second wireless communication terminal 31-2 in accordance with the at least one of the response signal or the data signal. The second operation signal is used for operating at least a part of the first wireless communication terminal 31-1. If none of the response signal and the data signal is received, the wireless transmitter 223 transmits the second operation signal to the second wireless communication terminal 31-2. The terminal-to-terminal communication between the first wireless communication terminal 31-1 and the second wireless communication terminal 31-2 to be started by the SLReq instruction signal is defined as including: transmitting the one or more first operation signals, which are transmitted to the second wireless communication terminal 31-2, is transmitted to the first wireless communication terminal 31-1 from the second wireless communication terminal 31-2; and transmitting the second operation signal, which is transmitted to the second wireless communication terminal 31-2, to the first wireless communication terminal 31-1 from the second wireless communication terminal 31-2.

With the above configuration, for example, even when the communication state of direct communication between the base station 22 (control system 2) and the first wireless communication terminal 31-1 is deteriorating, an operation signal for the first wireless communication terminal 31-1 can be transmitted to the first wireless communication terminal 31-1 from the base station 22 through relay communication via the second wireless communication terminal 31-2. Therefore, the control system 2 can operate the first wireless communication terminal 31-1 in a stable manner.

Each of various functions described in the first to third embodiments may be realized by a circuit (e.g., processing circuit). An exemplary processing circuit may be a programmed processor such as a central processing unit (CPU). The processor executes computer programs (instructions) stored in a memory thereby performs the described functions. The processor may be a microprocessor including an electric circuit. An exemplary processing circuit may be a digital signal processor (DSP), an application specific integrated circuit (ASIC), a microcontroller, a controller, or other electric circuit components. The components other than the CPU described according to the embodiments may be realized in a processing circuit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless base station comprising:

a transmitter configured to transmit a first control signal to a second wireless communication terminal and to transmit one or more first operation signals to the second wireless communication terminal, the first control signal instructing to transmit a signal that requests terminal-to-terminal communication between a first wireless communication terminal and the second wireless communication terminal, and the one or more first operation signals being used for operating at least a part of the first wireless communication terminal; and a receiver capable of receiving at least one of a response signal or a data signal that is transmitted from the first wireless communication terminal to the second wireless communication terminal after the one or more first operation signals are transmitted, wherein:

the transmitter is configured to:

transmit, if the at least one of the response signal or the data signal is received, a second operation signal to either the first wireless communication terminal or the second wireless communication terminal in accordance with the at least one of the response signal or the data signal, the second operation signal being used for operating at least a part of the first wireless communication terminal; and transmit, if neither of the response signal or the data signal is received, the second operation signal to the second wireless communication terminal, and the terminal-to-terminal communication between the first wireless communication terminal and the second wireless communication terminal to be started by the first control signal is defined as including:

transmitting the one or more first operation signals, which are transmitted to the second wireless communication terminal, to the first wireless communication terminal from the second wireless communication terminal; and transmitting the second operation signal, which is transmitted to the second wireless communication terminal, to the first wireless communication terminal from the second wireless communication terminal.

2. The wireless base station of claim 1, wherein:

the receiver is further capable of receiving a second control signal from the second wireless communication terminal after the first control signal is transmitted, the second control signal requesting terminal-to-terminal communication between the first wireless communication terminal and the second wireless communication terminal, and the transmitter is further configured to transmit the one or more first operation signals to the second wireless communication terminal if the second control signal is received.

3. The wireless base station of claim 1, wherein:

the first control signal instructs to transmit a signal that requests terminal-to-terminal communication between the first wireless communication terminal and the second wireless communication terminal or a signal that requests terminal-to-terminal communication between the first wireless communication terminal and a third wireless communication terminal, the transmitter is further configured to transmit the first control signal to the second wireless communication terminal and the third wireless communication terminal, the receiver is further capable of receiving a second control signal from the second wireless communication terminal and receiving a third control signal from the third wireless communication terminal after the first control signal is transmitted, the second control signal requesting terminal-to-terminal communication between the first wireless communication terminal and the second wireless communication terminal, and the third control signal requesting terminal-to-terminal communication between the first wireless communication terminal and the third wireless communication terminal, the transmitter is further configured to transmit, if the second control signal and the third control signal are received, the one or more first operation signals to either the second wireless communication terminal or the third wireless communication terminal, and the terminal-to-terminal communication between the first wireless communication terminal and the third wireless communication terminal to be started by the first control signal is defined as including transmitting the one or more first operation signals, which are transmitted to the third wireless communication terminal, to the first wireless communication terminal from the third wireless communication terminal.

4. The wireless base station of claim 1, wherein the transmitter is further configured to transmit the second operation signal to the first wireless communication terminal if a number of times of receiving the response signal, a number of times of receiving the data signal, or a sum of the number of times of receiving the response signal and the number of times of receiving the data signal exceeds a threshold.

5. The wireless base station of claim 1, wherein the transmitter is further configured to transmit the second operation signal to the first wireless communication terminal if the first wireless communication terminal moves to a first position.

6. The wireless base station of claim 1, wherein the transmitter is further configured to transmit the first control signal to the first wireless communication terminal.

7. A control system comprising:

the wireless base station of claim 1; and an electronic device, wherein the electronic device comprises:

a generator configured to generate the first control signal, the one or more first operation signals, and the second operation signal; and a controller configured to:

determine to transmit the first control signal and the one or more first operation signals to the second wireless communication terminal by using at least one of information related to movement of the first wireless communication terminal or a communication state between the first wireless communication terminal and the wireless base station;

determine, if at least one of the response signal or the data signal is received, whether the second operation signal is transmitted to the first wireless communication terminal or the second wireless communication terminal in accordance with the at least one of the response signal or the data signal; and determine, if neither of the response signal or the data signal is received, to transmit the second operation signal to the second wireless communication terminal.

8. The control system of claim 7, wherein the controller is further configured to determine to transmit the first control signal and the one or more first operation signals to the second wireless communication terminal by using at least one of information related to movement of the first wireless communication terminal, a communication state between the first wireless communication terminal and the wireless base station, information related to movement of the second wireless communication terminal, or a communication state between the second wireless communication terminal and the wireless base station.

9. The control system of claim 7, wherein:
the receiver is further capable of receiving a second control signal from the second wireless communication terminal after the first control signal is transmitted, the second control signal requesting terminal-to-terminal communication between the first wireless communication terminal and the second wireless communication terminal, and
the controller is further configured to allocate, if the second control signal is received, a resource that is used for the terminal-to-terminal communication with the first wireless communication terminal by the second wireless communication terminal.

10. An electronic device connected to a wireless base station which is wirelessly communicable with one or more wireless communication terminals, the electronic device comprising:
a generator configured to generate a first control signal and one or more first operation signals, the first control signal instructing to transmit a signal that requests terminal-to-terminal communication between a first wireless communication terminal and a second wireless communication terminal, and the one or more first operation signals being used for operating at least a part of the first wireless communication terminal;
a transmitter configured to transmit the first control signal to the second wireless communication terminal via the wireless base station, and to transmit the one or more first operation signals to the second wireless communication terminal via the wireless base station; and
a receiver capable of receiving, via the wireless base station, after the one or more first operation signals are transmitted, at least one of a response signal and a data signal that is transmitted from the first wireless communication terminal to the second wireless communication terminal,
wherein:
the transmitter is configured to:
transmit, if at least one of the response signal or the data signal is received, a second operation signal to either the first wireless communication terminal or the second wireless communication terminal via the wireless base station in accordance with the at least one of the response signal or the data signal, the second operation signal being used for operating at least a part of the first wireless communication terminal; and
transmit, if neither of the response signal or the data signal is received, the second operation signal to the second wireless communication terminal via the wireless base station, and the terminal-to-terminal communication between the first wireless communication terminal and the second wireless communication terminal to be started by the first control signal is defined as including:
transmitting the one or more first operation signals, which are transmitted to the second wireless communication terminal, to the first wireless communication terminal from the second wireless communication terminal; and
transmitting the second operation signal, which is transmitted to the second wireless communication terminal, to the first wireless communication terminal from the second wireless communication terminal.

11. A wireless communication terminal comprising:
a receiver configured to:
receive a first control signal from a wireless base station, the first control signal instructing to transmit a signal that requests terminal-to-terminal communication between a first wireless communication terminal and the wireless communication terminal; and
receive one or more first operation signals from the wireless base station, the one or more first operation signals being used for operating at least a part of the first wireless communication terminal; and
a transmitter configured to transmit the one or more first operation signals to the first wireless communication terminal,
wherein:
the transmitter is further configured to transmit a second control signal to the wireless base station if the first control signal is received, the second control signal requesting terminal-to-terminal communication between the first wireless communication terminal and the wireless communication terminal, and
the receiver is configured to receive a third control signal and the one or more first operation signals from the wireless base station after the second control signal is transmitted, the third control signal indicating a resource allocated for the terminal-to-terminal communication between the first wireless communication terminal and the wireless communication terminal.

12. The wireless communication terminal of claim 11, further comprising a controller configured to determine whether to transmit the second control signal to the wireless base station by using information related to movement of the first wireless communication terminal and information related to movement of the wireless communication terminal.

13. The wireless communication terminal of claim 11, further comprising:
an image capture unit configured to acquire an image of surroundings of the wireless communication terminal; and
a controller configured to determine whether to transmit the second control signal to the wireless base station by using the image.

14. The wireless communication terminal of claim 11, wherein:
the receiver is configured to:
receive, after the one or more first operation signals are transmitted, at least one of a response signal or a data signal that is transmitted from the first wireless communication terminal to the wireless communication terminal; and receive a second operation signal from the wireless base station after the at least one of the response signal or the data signal is received, the second operation signal being used for operating at least a part of the first wireless communication terminal, and the transmitter is configured to transmit the second operation signal to the first wireless communication terminal.

15. The wireless communication terminal of claim 11, wherein the receiver is further configured to:

receive a second control signal from the wireless base station, the second control signal instructing to transmit a signal that requests terminal-to-terminal communication between a third wireless communication terminal and the wireless communication terminal; and receive a third operation signal from the third wireless communication terminal, the third operation signal being used for operating at least a part of the wireless communication terminal.

16. The wireless communication terminal of claim 15, wherein:

the transmitter is further configured to transmit at least one of a response signal or a data signal to the third wireless communication terminal after the third operation signal is received, and the receiver is further configured to:

receive a fourth operation signal from the wireless base station if the at least one of the response signal or the data signal is received by the wireless base station, the fourth operation signal being used for operating at least a part of the wireless communication terminal; and receive the fourth operation signal from the third wireless communication terminal if neither of the response signal or the data signal is received by the wireless base station.

17. The wireless communication terminal of claim 15, wherein the receiver is further configured to receive a fifth operation signal from the wireless base station if the wireless communication terminal moves to a first position, the fifth operation signal being used for operating at least a part of the wireless communication terminal.

* * * * *